(12) United States Patent
Polizzotto

(10) Patent No.: US 10,803,498 B2
(45) Date of Patent: *Oct. 13, 2020

(54) SOCIAL PLATFORM PROMOTION SYSTEM AND METHOD

(71) Applicant: Givewith LLC, New York, NY (US)

(72) Inventor: Paul A. Polizzotto, Southampton, NY (US)

(73) Assignee: Givewith LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,807

(22) Filed: Jan. 11, 2019

(65) Prior Publication Data

US 2019/0236649 A1 Aug. 1, 2019

Related U.S. Application Data

(60) Provisional application No. 62/625,042, filed on Feb. 1, 2018, provisional application No. 62/625,080, filed
(Continued)

(51) Int. Cl.
*G06Q 10/10* (2012.01)
*G06Q 30/02* (2012.01)
(Continued)

(52) U.S. Cl.
CPC ....... *G06Q 30/0282* (2013.01); *G06F 16/248* (2019.01); *G06F 16/288* (2019.01); *G06F 16/9538* (2019.01); *G06F 21/10* (2013.01); *G06Q 10/04* (2013.01); *G06Q 10/067* (2013.01); *G06Q 10/0633* (2013.01); *G06Q 10/0635* (2013.01); *G06Q 10/0637* (2013.01); *G06Q 10/0639* (2013.01); *G06Q 10/06313* (2013.01); *G06Q 10/06393* (2013.01); *G06Q 30/0245* (2013.01); *G06Q 30/0263* (2013.01); *G06Q 30/0269* (2013.01); *G06Q 30/0277* (2013.01); *G06Q 30/0279* (2013.01); *G06Q 40/06* (2013.01); *G06Q 50/01* (2013.01)

(58) Field of Classification Search
CPC ............ G06Q 30/018; G06Q 30/0263; G06Q 10/0639; G06Q 50/01
USPC .................................................. 705/1.1–912
See application file for complete search history.

(56) References Cited

U.S. PATENT DOCUMENTS 8,165,891 B2 4/2012 Roberts
8,769,558 B2 7/2014 Navar
(Continued)

OTHER PUBLICATIONS

Burkart, Karl "Causecast technology to power a new wave of employee activism," Mother Nature Network/ Tech/ Computers, Feb. 13, 2012. (Year: 2012).*
(Continued)

*Primary Examiner* — Jonathan P Ouellette
(74) *Attorney, Agent, or Firm* — Brian J. Colandreo; Jeffrey T. Placker; Holland & Knight LLP

(57) ABSTRACT

A computer-implemented method, computer program product, and computing system for receiving a contribution for a social platform from a client; producing promotional material for the client concerning their contribution to the social platform, wherein this promotional material is configured to positively impact a current responsibility score associated with the client; and publishing the promotional material.

24 Claims, 16 Drawing Sheets

Related U.S. Application Data on Feb. 1, 2018, provisional application No. 62/655,522, filed on Apr. 10, 2018.

(51) Int. Cl.

| | | |
|---|---|---|
| G06Q 30/06 | (2012.01) | |
| G06Q 10/04 | (2012.01) | |
| G06Q 10/06 | (2012.01) | |
| G06Q 50/00 | (2012.01) | |
| G06Q 40/06 | (2012.01) | |
| G06F 16/9538 | (2019.01) | |
| G06F 21/10 | (2013.01) | |
| G06F 16/28 | (2019.01) | |
| G06F 16/248 | (2019.01) | |

(56) References Cited

U.S. PATENT DOCUMENTS

| | | |
|---|---|---|
| 8,788,586 B1 | 7/2014 | Vandehy et al. |
| 9,438,619 B1 | 9/2016 | Chan et al. |
| 9,525,902 B2 | 12/2016 | Navar |
| 2003/0018487 A1 | 1/2003 | Young et al. |
| 2003/0036944 A1 | 2/2003 | Lesandrini et al. |
| 2003/0105690 A1 | 6/2003 | Brown et al. |
| 2004/0181436 A1 | 9/2004 | Lange |
| 2006/0033959 A1 | 2/2006 | Allen |
| 2008/0005017 A1 | 1/2008 | Poster |
| 2008/0133513 A1* | 6/2008 | Linde ............... G06Q 30/02 |
| 2008/0168000 A1 | 7/2008 | Dunn |
| 2008/0243722 A1 | 10/2008 | Nespola |
| 2008/0288277 A1 | 11/2008 | Fasciano |
| 2009/0063229 A1* | 3/2009 | Coladonato ........... G06Q 30/02 |
| | | 705/14.44 |
| 2009/0099887 A1* | 4/2009 | Sklar ............... G06Q 10/06395 |
| | | 705/7.41 |
| 2009/0117968 A1 | 5/2009 | Krieterneyer et al. |
| 2009/0254387 A1 | 10/2009 | Daken et al. |
| 2010/0114637 A1 | 5/2010 | Folkert et al. |
| 2010/0161465 A1* | 6/2010 | McMaster .............. G06Q 10/10 |
| | | 705/34 |
| 2010/0205541 A1 | 8/2010 | Rapaport et al. |
| 2010/0217613 A1 | 8/2010 | Kelly |
| 2011/0047035 A1* | 2/2011 | Gidwani ............... G06Q 30/02 |
| | | 705/14.73 |
| 2011/0082726 A1 | 4/2011 | Bower |
| 2011/0166928 A1 | 7/2011 | Robinson et al. |
| 2011/0264521 A1 | 10/2011 | Straka |
| 2011/0282860 A1* | 11/2011 | Baarman ............... G06F 16/951 |
| | | 707/709 |
| 2012/0054024 A1 | 3/2012 | Polizzotto |
| 2012/0197652 A1 | 8/2012 | Corrigan et al. |
| 2012/0260209 A1 | 10/2012 | Stibel et al. |
| 2012/0278767 A1 | 11/2012 | Stibel et al. |
| 2012/0296809 A1 | 11/2012 | Ross |
| 2013/0060762 A1 | 3/2013 | Bailey, Jr. et al. |
| 2013/0091147 A1* | 4/2013 | Kim ................... G06F 16/3334 |
| | | 707/748 |
| 2013/0151326 A1 | 6/2013 | Engstrom et al. |
| 2013/0159127 A1 | 6/2013 | Myslinki |
| 2013/0219459 A1 | 8/2013 | Bradley |
| 2013/0232030 A1* | 9/2013 | Gockeler ............... H04L 67/22 |
| | | 705/26.8 |
| 2014/0019259 A1 | 1/2014 | Dung et al. |
| 2014/0074824 A1 | 3/2014 | Rad et al. |
| 2014/0114962 A1* | 4/2014 | Rosenburg ........... G06Q 10/063 |
| | | 707/723 |
| 2014/0122354 A1 | 5/2014 | Stibel et al. |
| 2014/0195549 A1 | 7/2014 | Ahn et al. |
| 2014/0370972 A1 | 12/2014 | Mullen et al. |
| 2015/0006363 A1 | 1/2015 | Sobhani et al. |
| 2015/0095262 A1 | 4/2015 | McIntosh et al. |
| 2015/0142520 A1* | 5/2015 | Bala ................... G06Q 30/0203 |
| | | 705/7.32 |
| 2015/0154667 A1 | 6/2015 | Hicks et al. |
| 2015/0156148 A1* | 6/2015 | Doulton ............... H04L 51/063 |
| | | 709/206 |
| 2015/0254291 A1 | 9/2015 | Raikula et al. |
| 2015/0269251 A1* | 9/2015 | Kim ..................... G06F 16/3334 |
| | | 707/748 |
| 2015/0348070 A1* | 12/2015 | Boettcher ........... G06Q 30/0203 |
| | | 705/7.32 |
| 2015/0379590 A1* | 12/2015 | Michaels ........... G06Q 30/0279 |
| | | 705/32 |
| 2015/0379591 A1 | 12/2015 | Massarik |
| 2016/0026918 A1 | 1/2016 | Barbieri et al. |
| 2016/0048932 A1 | 2/2016 | McNelley et al. |
| 2016/0224767 A1 | 8/2016 | Steelberg |
| 2016/0253710 A1* | 9/2016 | Publicover ............. H04W 4/21 |
| | | 705/14.66 |
| 2016/0300283 A1* | 10/2016 | Soderstrom ........... G06Q 20/04 |
| 2016/0352908 A1 | 12/2016 | Sloan et al. |
| 2017/0024832 A1 | 1/2017 | Dareshani |
| 2017/0228801 A1 | 8/2017 | Jackson et al. |
| 2017/0277691 A1 | 9/2017 | Agarwal |
| 2017/0296919 A1 | 10/2017 | Margiotta |
| 2017/0301038 A1 | 10/2017 | Mawji et al. |
| 2017/0308589 A1 | 10/2017 | Liu et al. |
| 2018/0075393 A1* | 3/2018 | Lovell .................. G06Q 10/06 |
| 2018/0343495 A1 | 11/2018 | Loheide et al. |
| 2019/0228442 A1 | 7/2019 | Fojtik |

OTHER PUBLICATIONS

Srebre, Tessa, "Causecast and VolunterrMatch Launch Groundbreaking Partnership," VolunteerMatch Blog (www.volunteermatch.org)/Announcements, Jan. 25, 2016 (Year: 2016).*

Cooney et al, "Nonprofit Policy Forum Measuring the Social Returns of Nonprofits and Social Enterprises the Promise and Perils of the SROI," De Gruyter, Non Profit Forum, Symposium Article, 2014 (Year: 2014).*

Non-Final Office Action issued in U.S. Appl. No. 16/245,789 dated Mar. 18, 2019.

Non-Final Office Action issued in U.S. Appl. No. 16/245,845 dated Mar. 18, 2019.

International Search Report issued in PCT Application Serial No. PCT/US2019/013232 dated Mar. 25, 2019.

International Search Report issued in PCT Application Serial No. PCT/US2019/013257 dated Mar. 25, 2019.

Non-Final Office Action issued in U.S. Appl. No. 16/245,907 dated Mar. 6, 2019.

Non-Final Office Action issued in U.S. Appl. No. 16/245,981 dated Mar. 18, 2019.

Non-Final Office Action issued in U.S. Appl. No. 16/246,190 dated Mar. 18, 2019.

Non-Final Office Action issued in U.S. Appl. No. 16/246,020 dated Mar. 18, 2019.

Non-Final Office Action issued in U.S. Appl. No. 16/246,146 dated Mar. 18, 2019.

Non-Final Office Action issued in U.S. Appl. No. 16/246,198 dated Mar. 18, 2019.

Non-Final Office Action issued in U.S. Appl. No. 16/246,260 dated Mar. 18, 2019.

Non-Final Office Action issued in U.S. Appl. No. 16/245,669 dated Mar. 19, 2019.

Non-Final Office Action issued in U.S. Appl. No. 16/245,699 dated Mar. 20, 2019.

Non-Final Office Action issued in U.S. Appl. No. 16/246,099 dated Mar. 21, 2019.

Non-Final Office Action issued in U.S. Appl. No. 16/246,149 dated Mar. 18, 2019.

International Search Report issued in PCT Application Serial No. PCT/US2019/013197 dated Mar. 22, 2019.

Non-Final Office Action issued in U.S. Appl. No. 16/246,223 dated Mar. 18, 2019.

Non-Final Office Action issued in U.S. Appl. No. 16/246,078 dated Apr. 1, 2019.

Non-Final Office Action issued in U.S. Appl. No. 16/246,058 dated Apr. 1, 2019.

(56) References Cited

OTHER PUBLICATIONS

International Search Report issued in PCT Application Serial No. PCT/US2019/013292 dated Mar. 25, 2019.
International Search Report issued in PCT Application Serial No. PCT/US2019/013180 dated Mar. 25, 2019.
International Search Report issued in PCT Application Serial No. PCT/US2019/013136 dated Mar. 25, 2019.
International Search Report issued in PCT Application Serial No. PCT/US2019/013204 dated Mar. 25, 2019.
International Search Report issued in PCT Application Serial No. PCT/US2019/013191 dated Mar. 25, 2019.
International Search Report issued in PCT Application Serial No. PCT/US2019/013301 dated Mar. 25, 2019.
International Search Report issued in PCT Application Serial No. PCT/US2019/013273 dated Mar. 25, 2019.
International Search Report issued in PCT Application Serial No. PCT/US2019/013240 dated Mar. 25, 2019.
International Search Report issued in PCT Application Serial No. PCT/US2019/013309 dated Mar. 22, 2019.
International Search Report issued in PCT Application Serial No. PCT/US2019/013133 dated Mar. 22, 2019.
International Search Report issued in PCT Application Serial No. PCT/US2019/013139 dated Mar. 25, 2019.
International Search Report issued in PCT Application Serial No. PCT/US2019/013170 dated Mar. 25, 2019.
International Search Report issued in PCT Application Serial No. PCT/US2019/013143 dated Mar. 26, 2019.
International Search Report issued in PCT Application Serial No. PCT/US2019/013187 dated Mar. 25, 2019.
Final Office Action issued in U.S. Appl. No. 16/246,190 dated Jul. 9, 2019.
Final Office Action issued in U.S. Appl. No. 16/246,223 dated Jul. 9, 2019.
Final Office Action issued in U.S. Appl. No. 16/246,149 dated Jul. 9, 2019.
Final Office Action issued in U.S. Appl. No. 16/246,669 dated Jul. 9, 2019.
Final Office Action issued in U.S. Appl. No. 16/245,789 dated Jul. 9, 2019.
Final Office Action issued in U.S. Appl. No. 16/246,198 dated Jul. 9, 2019.
Final Office Action issued in U.S. Appl. No. 16/246,058 dated Oct. 4, 2019.
Final Office Action issued in U.S. Appl. No. 16/245,907 dated Oct. 1, 2019.
Final Office Action issued in U.S. Appl. No. 16/245,845 dated Aug. 7, 2019.
Final Office Action issued in U.S. Appl. No. 16/245,981 dated Aug. 7, 2019.
Final Office Action issued in U.S. Appl. No. 16/246,020 dated Aug. 7, 2019.
Final Office Action issued in U.S. Appl. No. 16/246,260 dated Aug. 7, 2019.
Final Office Action issued in U.S. Appl. No. 16/245,699 dated Sep. 9, 2019.
Final Office Action issued in U.S. Appl. No. 16/246,099 dated Sep. 3, 2019.
Final Office Action issued in U.S. Appl. No. 16/246,078 dated Oct. 11, 2019.
Non-Final Office Action issued in U.S. Appl. No. 16/245,699 dated Mar. 6, 2020.
Non-Final Office Action issued in U.S. Appl. No. 16/246,020 dated Jan. 8, 2020.
Non-Final Office Action issued in U.S. Appl. No. 16/245,981 dated Jan. 8, 2020.
Non-Final Office Action issued in U.S. Appl. No. 16/246,260 dated Jan. 8, 2020.
Non-Final Office Action issued in U.S. Appl. No. 16/245,845 dated Jan. 21, 2020.
Non-Final Office Action issued in U.S. Appl. No. 16/246,190 dated Jan. 31, 2020.
Non-Final Office Action issued in U.S. Appl. No. 16/246,099 dated Jan. 24, 2020.
Non-Final Office Action issued in U.S. Appl. No. 16/246,198 dated Jan. 30, 2020.
Non-Final Office Action issued in U.S. Appl. No. 16/245,789 dated Feb. 3, 2020.
Non-Final Office Action issued in U.S. Appl. No. 16/245,669 dated Feb. 7, 2020.
Non-Final Office Action issued in U.S. Appl. No. 16/246,223 dated Feb. 12, 2020.
Clairification: Hot to Use the Multiplier Effect to Inspire Annual Giving. (https://clarirification.com/2016/08/01/multiplication-can-teach-fundraisers-asking/} Published Aug. 1, 2016.
Non-Final Office Action issued in U.S. Appl. No. 16/246,149 dated Feb. 10, 2020.
Non-Final Office Action issued in U.S. Appl. No. 16/246,907 dated Mar. 4, 2020.
Notice of Allowance issued in related U.S. Appl. No. 16/246,099 dated Jul. 29, 2020.
Bodnar, S. R., "Getting Attention for a Ceramic Art Exhibition: A Case Study of a Nonprofit's Promotional Campaign", Rochester Institute of Technolgoy, Pro Quest Dissertations Publishing, 2012, 1530767, 70 pages.
[No Author], Dialog, Scientific and Technical Information Center, Report Information from Dialog, Jul. 20, 2020 10:07, 21 pages.
Notice of Allowance issued in related U.S. Appl. No. 16/245,845 dated Jun. 10, 2020.
Notice of Allowance issued in related U.S. Appl. No. 16/245,981 dated Jun. 18, 2020.
Non-Final Office Action issued in related U.S. Appl. No. 16/246,058 dated Jun. 29, 2020.
Final Office Action issued in related U.S. Appl. No. 16/246,190 dated Jul. 13, 2020.
Final Office Action issued in related U.S. Appl. No. 16/246,198 dated Jul. 13, 2020.
Final Office Action issued in related U.S. Appl. No. 16/246,223 dated Jul. 13, 2020.
Notice of Allowance issued in related U.S. Appl. No. 16/246,907 dated Aug. 20, 2020.

\* cited by examiner

US 10,803,498 B2

SOCIAL PLATFORM PROMOTION SYSTEM AND METHOD

RELATED APPLICATION(S)

This application claims the benefit of the following U.S. Provisional Application Nos. 62/625,042, filed on 1 Feb. 2018; 62/625,080, filed on 1 Feb. 2018; and 62/655,522, filed on 10 Apr. 2018; their entire contents of which are incorporated herein by reference.

TECHNICAL FIELD

This disclosure relates to promotion systems and, more particularly, to social platform promotion system.

BACKGROUND

People are inherently good and want to help one another. Accordingly, there are a vast quantity of social platforms that are in the business of serving the underserved for the general betterment of society. Unfortunately, it is often difficult to research such social platforms to gauge e.g., their legitimacy, their efficiency, and their success record.

Additionally, corporations are often conflicted between doing what is best for society and doing what is best for the shareholders of that company. For example, corporate contributions to such social platforms (while being for the betterment of society) may reduce corporate profits and, therefore, reduce corporate share price. Further, institutional investors may be reluctant to invest in companies that make contributions to such social platforms due to the reduction in profitability that often accompanies such contributions.

While an enlightened sense of investing (due to criteria such as ESG scores) may move investors towards such socially-conscious companies, there must be a better way to more actively encourage such investment.

SUMMARY OF DISCLOSURE

In one implementation, a computer-implemented method is executed on a computing device and includes: receiving a contribution for a social platform from a client; producing promotional material for the client concerning their contribution to the social platform, wherein this promotional material is configured to positively impact a current responsibility score associated with the client; and publishing the promotional material.

One or more of the following features may be included. The social platform may be chosen from a social platform pool. The social platform pool may define a plurality of prevetted social platforms. The social platform pool may be maintained. The social platform pool may be maintained within a data structure. Publishing the promotional material may include: publishing the promotional material in a plurality of formats. Publishing the promotional material may include: pushing the promotional material to a rating agency. The current responsibility score associated with the client may include one or more of: an environmental score; a social score; and a governance score.

In another implementation, a computer program product resides on a computer readable medium and has a plurality of instructions stored on it. When executed by a processor, the instructions cause the processor to perform operations including receiving a contribution for a social platform from a client; producing promotional material for the client concerning their contribution to the social platform, wherein this promotional material is configured to positively impact a current responsibility score associated with the client; and publishing the promotional material.

One or more of the following features may be included. The social platform may be chosen from a social platform pool. The social platform pool may define a plurality of prevetted social platforms. The social platform pool may be maintained. The social platform pool may be maintained within a data structure. Publishing the promotional material may include: publishing the promotional material in a plurality of formats. Publishing the promotional material may include: pushing the promotional material to a rating agency. The current responsibility score associated with the client may include one or more of: an environmental score; a social score; and a governance score.

In another implementation, a computing system includes a processor and memory is configured to perform operations including receiving a contribution for a social platform from a client; producing promotional material for the client concerning their contribution to the social platform, wherein this promotional material is configured to positively impact a current responsibility score associated with the client; and publishing the promotional material.

One or more of the following features may be included. The social platform may be chosen from a social platform pool. The social platform pool may define a plurality of prevetted social platforms. The social platform pool may be maintained. The social platform pool may be maintained within a data structure. Publishing the promotional material may include: publishing the promotional material in a plurality of formats. Publishing the promotional material may include: pushing the promotional material to a rating agency. The current responsibility score associated with the client may include one or more of: an environmental score; a social score; and a governance score.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
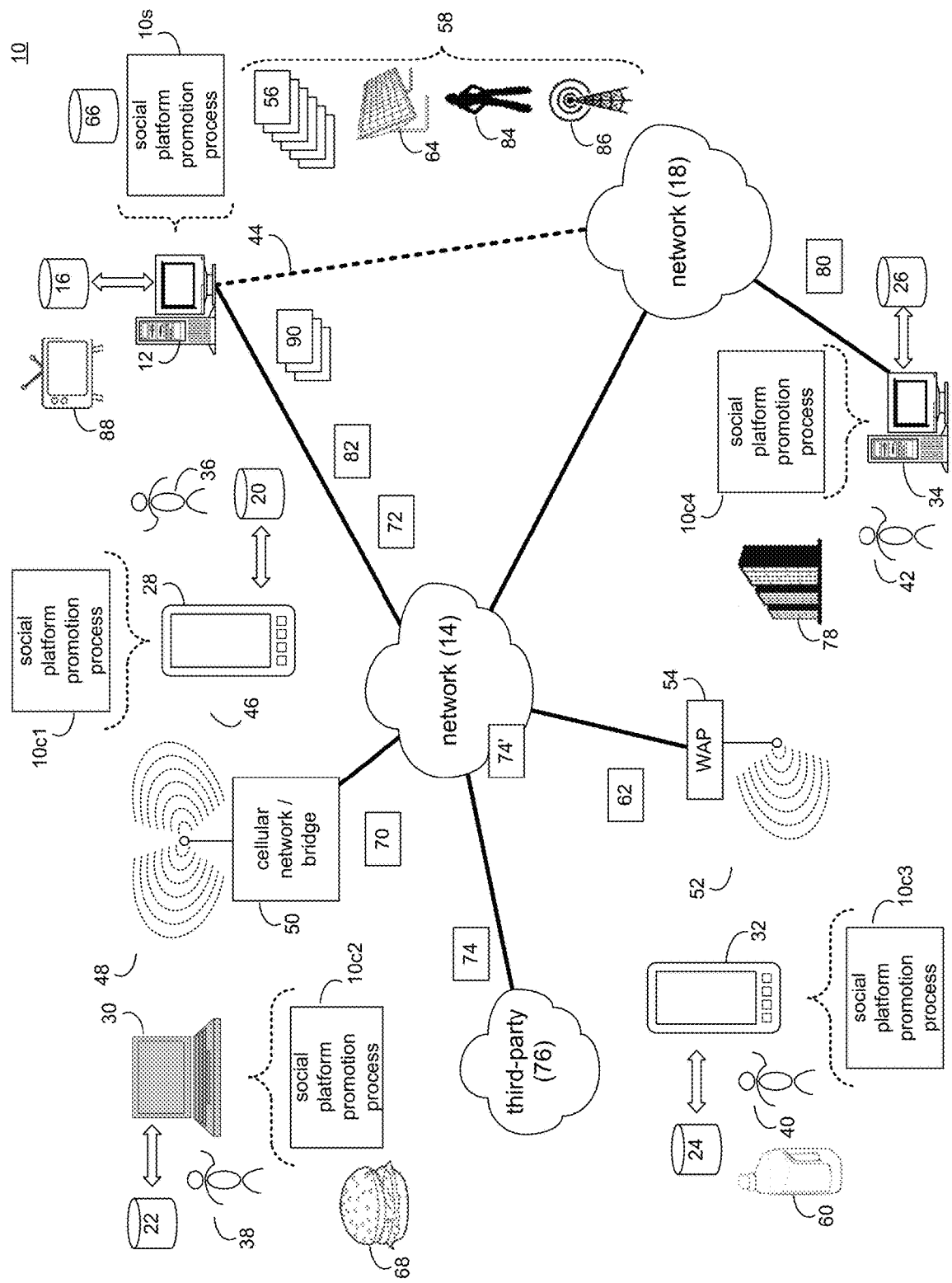
FIG. 1 is a diagrammatic view of a distributed computing network including a computing device that executes a social platform promotion process according to an embodiment of the present disclosure.

Referring to FIG. 1, there is shown social platform promotion process 10. Social platform promotion process 10 may be implemented as a server-side process, a client-side process, or a hybrid server-side/client-side process. For example, social platform promotion process 10 may be implemented as a purely server-side process via social platform promotion process 10s. Alternatively, social platform promotion process 10 may be implemented as a purely client-side process via one or more of social platform promotion process 10c1, social platform promotion process 10c2, social platform promotion process 10c3, and social platform promotion process 10c4. Alternatively still, social platform promotion process 10 may be implemented as a hybrid server-side/client-side process via social platform promotion process 10s in combination with one or more of social platform promotion process 10c1, social platform promotion process 10c2, social platform promotion process 10c3, and social platform promotion process 10c4. Accordingly, social platform promotion process 10 as used in this disclosure may include any combination of social platform promotion process 10s, social platform promotion process 10c1, social platform promotion process 10c2, social platform promotion process 10c3, and social platform promotion process 10c4.

Social platform promotion process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of social platform promotion process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of social platform promotion processes 10c1, 10c2, 10c3, 10c4 may include but are not limited to a web browser, a user interface, or a specialized application (e.g., an application running on e.g., the Android™ platform or the iOS™ platform). The instruction sets and subroutines of social platform promotion processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage device 16 may include but are not limited to: a hard disk drive; a RAID device; a random access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Clients 36, 38, 40, 42 may access social platform promotion process 10 directly through network 14 or through secondary network 18. Further, social platform promotion process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Social Platform Promotion Process

Figure 2:
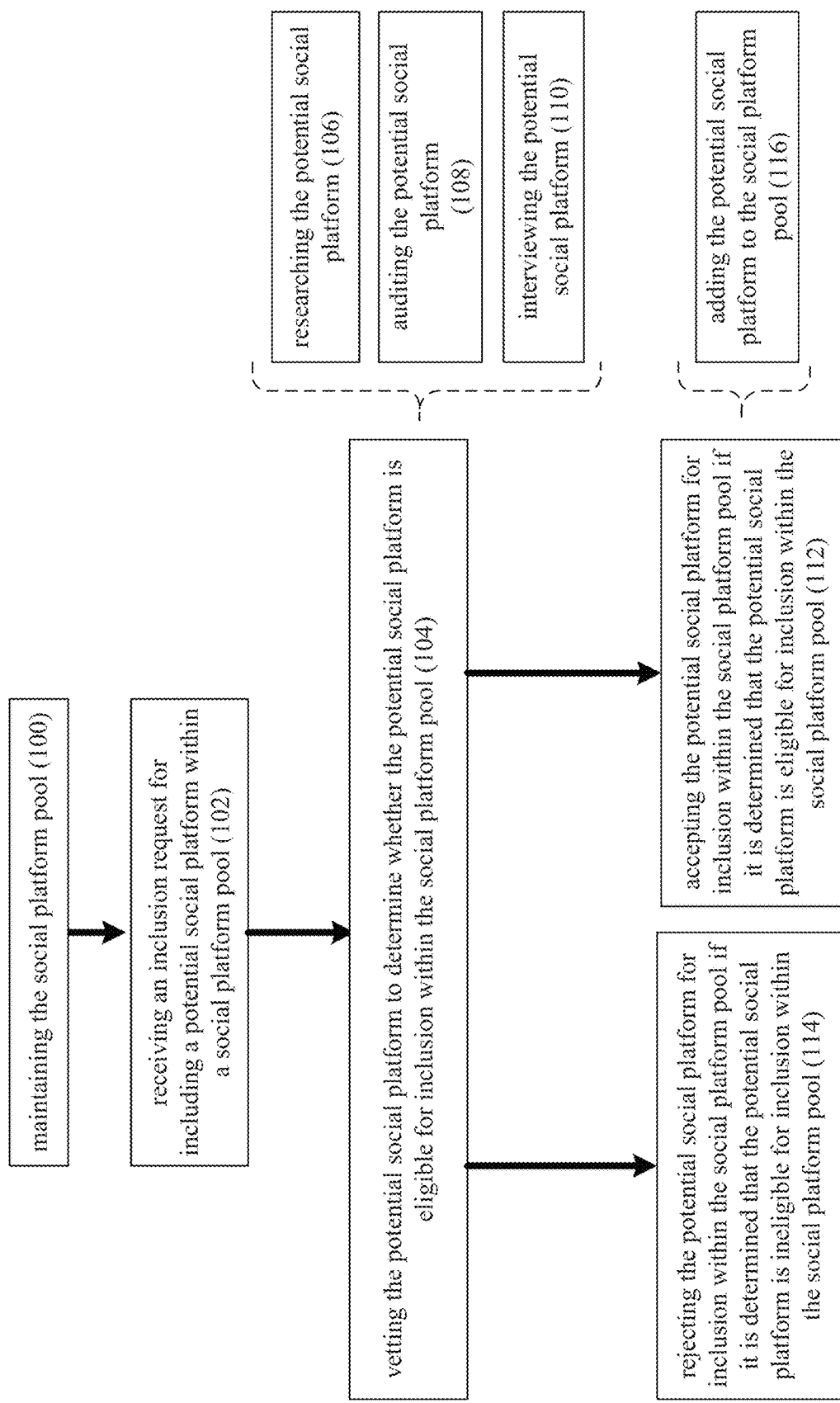
FIG. 2 is a flowchart of one implementation of the social platform promotion process of FIG. 1 according to an embodiment of the present disclosure.

Referring also to FIG. 2, social platform promotion process 10 may be configured to define and maintain 100 social platform pool 56. For example, social platform pool 56 may be maintained 100 within a data structure (e.g., storage device 16 coupled to computing device 12). Accordingly, storage device 16 may include a database (not shown) within which social platform pool 56 may be defined and maintained 100.

As will be explained below in greater detail, through the use of social platform promotion process 10, clients may review the various social platforms (defined within social platform pool 56) and choose one or more of these social platforms for funding. Further and as will be discussed below in greater detail, clients may receive recommendations from social platform promotion process 10 concerning the various social platforms (defined within social platform pool 56) that the client may consider funding.

Defining the Social Platform Pool

Accordingly and through the use of social platform promotion process 10, the various social platforms (e.g. charities, environmental organizations, equality organizations, inclusion organizations, veterans organizations, civil rights organizations, constitutional rights organizations, and poverty alleviation organizations) may utilize social platform promotion process 10 to seek inclusion within social platform pool 56. Once included within social platform pool 56, clients of social platform promotion process 10 may have their "social standing" analyzed so that strengths and weaknesses within the same may be identified. Once the strengths and weaknesses within a client's "social standing" are identified, social platform promotion process 10 may provide recommendations to the client concerning how they may enhance their "social standing". For example, social platform promotion process 10 may recommend that the client contribute to one or more social platforms to address one or more identified weaknesses in their "social standing". Additionally/alternatively, social platform promotion process 10 may recommend that the client contribute to one or more social platforms to further bolster one or more identified strengths in their "social standing".

Populating the Prevetted Pool

As will be discussed below in greater detail, social platform promotion process 10 may be configured to vet each social platform prior to allowing a social platform to be included within social platform pool 56, thus resulting in social platform pool 56 defining plurality of prevetted social platforms 58.

Assume for illustrative purposes that client 40 is involved with social platform 60 (e.g. Baja Plastics), which is an environmental social platform that recovers water-born plastics from the ocean so that such recovered plastic may be recycled. Accordingly, social platform 60 may achieve two goals, namely: a) the removal of plastic from the ocean; and b) the recycling of such removed plastic. Further, assume that social platform 60 would like to be included within social platform pool 56 so that clients of social platform promotion process 10 may learn about social platform 60 and (hopefully) contribute to the same. Accordingly, social platform 60 may prepare inclusion request 62 that may be submitted to social platform promotion process 10 so that social platform 60 may be added to (and thus included within) social platform pool 56.

Accordingly, social platform promotion process 10 may receive 102 an inclusion request (e.g., inclusion request 62) for including a potential social platform (e.g., social platform 60) within a social platform pool (e.g., social platform pool 56). Upon receiving 102 inclusion request 62, social platform promotion process 10 may vet 104 the potential social platform (e.g., social platform 60) to determine whether the potential social platform (e.g., social platform 60) is eligible for inclusion within the social platform pool (e.g., social platform pool 56).

As is known in the art, vetting is the process of performing an extensive background check on a person or an entity prior to the occurrence of an event. Accordingly and through the use of such vetting 104 prior to including a social platform within social platform pool 56, social platform promotion process 10 may ensure that the social platforms included within social platform pool 56 are of the highest quality and integrity.

When vetting 104 the potential social platform (e.g., social platform 60) to determine whether the potential social platform (e.g., social platform 60) is eligible for inclusion within social platform pool 56, social platform promotion process 10 may e.g., research 106 the potential social platform (e.g., social platform 60); audit 108 the potential social platform (e.g., social platform 60); and/or interview 110 the potential social platform (e.g., social platform 60).

For example and through the use of automated and/or manual methodologies, the integrity of the potential social platform (e.g., social platform 60) may be analyzed by e.g., performing online research concerning the potential social platform (e.g., social platform 60); analyzing one or more financial documents concerning the potential social platform (e.g., social platform 60); performing one or more interviews with representatives of the potential social platform (e.g., social platform 60); performing one or more interviews with third-parties concerning the potential social platform (e.g., social platform 60); having the potential social platform (e.g., social platform 60) populate an application that provides data to social platform promotion process 10; and employing a third-party to perform research on the potential social platform (e.g., social platform 60).

While the preceding list of vetting methodologies is intended to be illustrative, it is not intended to be all-inclusive, as other methodologies are possible and are considered to be within the scope of this disclosure. Accordingly and with respect to this disclosure, it is understood that social platform promotion process 10 may utilize additional/alternative vetting methodologies.

Once the vetting 104 of the potential social platform (e.g., social platform 60) is completed, social platform promotion process 10 may either accept 112 or reject 114 the potential social platform (e.g., social platform 60) for inclusion within social platform pool 56.

For example, social platform promotion process 10 may accept 112 the potential social platform (e.g., social platform 60) for inclusion within social platform pool 56 if it is determined (e.g., via the vetting process) that the potential social platform (e.g., social platform 60) is eligible for inclusion within social platform pool 56 (e.g., due to high levels of integrity/efficiency/advocacy). Accordingly and in the event that the above-described vetting methodologies prove social platform 62 to be a social platform worthy of inclusion within social platform pool 56, social platform promotion process 10 may accept 112 social platform 60 for inclusion within social platform pool 56, which may include adding 116 social platform 60 to social platform pool 56.

Conversely, social platform promotion process 10 may reject 114 the potential social platform (e.g., social platform 60) for inclusion within social platform pool 56 if it is determined (e.g., via the vetting process) that the potential social platform (e.g., social platform 60) is ineligible for inclusion within social platform pool 56 (e.g., due to questionable levels of integrity/efficiency/advocacy). For example and if it is determined through the above-described vetting process that social platform 60 has questionable operating procedures, social platform promotion process 10 may reject 114 social platform 60 for inclusion within social platform pool 56.

Enhancing the Social Platform Pool

Once the various social platforms are admitted to social platform pool 56, social platform promotion process 10 may be configured to gather additional information concerning these social platforms, wherein such information may allow clients of social platform promotion process 10 to review these social platforms and decide which (if any) they would like to make a contribution to.

Impact Multiplier

One such piece of information that social platform promotion process 10 may examine with respect to the social platforms included within social platform pool 56 is the general level of efficiency of such social platform. Specifically, how well do the results achieved by the social platform track with the contributions received by the social platform. For example, a social platform that produces $150 worth of results with a $100 contribution is substantially more efficient than a social platform that produces $50 worth of results for the same $100 contribution.

Figure 3:
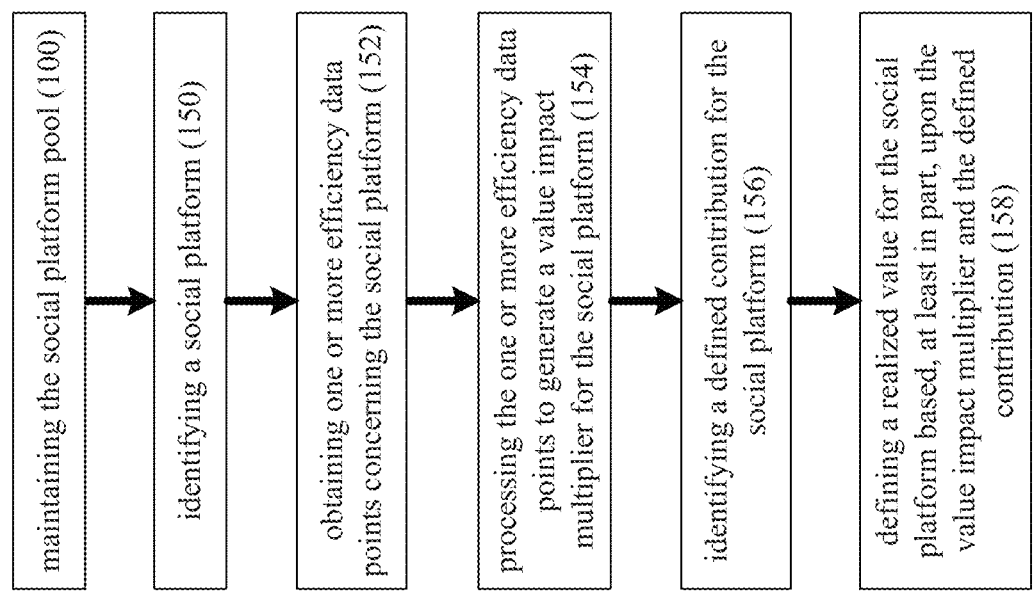
FIG. 3 is a flowchart of another implementation of the social platform promotion process of FIG. 1 according to an embodiment of the present disclosure.

Accordingly and referring also to FIG. 3, social platform promotion process 10 may identify 150 a social platform for such efficiency analysis (from the various social platforms that is included within social platform pool 56) and may obtain 152 one or more efficiency data points concerning the social platform.

For this example, assume that social platform 64 within social platform pool 56 is a social platform that installs solar panels on the roofs of houses owned by low income families. Further, assume that social platform promotion process 10 identifies 150 social platform 64 (from the social platforms included within social platform pool 56) for such efficiency analysis and obtains 152 one or more efficiency data points concerning social platform 64. As discussed above, social platform pool 56 may be maintained 100 by social platform promotion process 10 and may define plurality of prevetted social platforms 58.

As will be discussed below in greater detail, examples of such efficiency data points obtained 152 by social platform promotion process 10 may include but are not limited to one or more of: an employment data point; a training data point; a social dependency data point; a tax revenue data point; and a project efficiency data point.

Assume that social platform 64 is highly efficient and has minimal overhead/operating costs, resulting in 92% of all contributions being utilized for the project itself. Accordingly and for every $100,000 contribution, $92,000 in goods/services are provided (i.e., a project efficiency data point). Further assume that social platform 64 is committed to hiring qualified people that are currently unemployed to do the solar panel installation (i.e., therefore, reducing local unemployment and providing technology-based job-training). Accordingly, assume that it is determined that for each $100,000 contribution, ten previously unemployed people will be gainfully employed for two months (i.e., an employment data point). Therefore, social dependency costs (e.g., welfare, unemployment, food stamps, and various subsidies) may be eliminated. Assume for this example that these costs are estimated to be $2000 per month per employee (resulting in a social dependency data point showing a $40,000 reduction in social dependency costs). Additionally, assume for this example that each of these ten employees will be paying $1000 in federal/state/local income taxes during their employment (resulting in a tax revenue data point showing a $10,000 increase in tax revenue). Additionally, assume that each of these ten employees will receive approximately $5000 worth of training in electrical circuitry and renewable energy systems (resulting in a training data point showing $50,000 of job-training training). Accordingly, it appears that for every $100,000 contribution to social platform 64, $192,000 worth of goods/services are provided (i.e., $92,000+$40,000+$10,000+$50,000).

Social platform promotion process 10 may then process 154 these efficiency data points (e.g., the employment data point of ten new jobs; the training data point of $50,000; the social dependency data point of $40,000; the tax revenue data point of $10,000; and the project efficiency data point of $92,000) to generate a value impact multiplier for social platform 64 of 1.92× (or 192%), wherein every $1.00 of contribution to social platform 64 results in $1.92 being given back (i.e., provided to the community). Additionally, it is understood that such an impact multiplier may not take into account various intangibles that are not easily quantified. For example, an increase in employment may result in a decrease in crime (due to a reduction in desperation and an infusion of hope). Further, the installation of such solar panels may result in a reduced reliance on fossil fuels, a reduction in greenhouse gas emissions and the various benefits resulting therefrom.

Once the above-described value impact multiplier is generated, social platform promotion process 10 may identify 156 a defined contribution for the social platform (e.g., social platform 64) and may define 158 a realized value for the social platform (e.g., social platform 64) based, at least in part, upon the value impact multiplier and the defined contribution. For example, social platform promotion process 10 may identify 156 a defined contribution of $100,000 with respect to social platform 64 wherein social platform promotion process 10 may then define 158 a realized value of $192,000 (i.e., $100,000×1.92) for social platform 64, thus allowing social platform promotion process 10 to illustrate the comparative effectiveness/efficiency of social platform 64 using a generalized defined contribution of $100,000. As would be expected, this $100,000 defined contribution is for illustrative purposes only and is not intended to be a limitation of this disclosure, as other configurations are possible. For example, the defined contribution may always be identified 156 as $1.00, wherein social platform promotion process 10 may define 158 a realized value of $1.92 for each $1.00 of contribution.

Social Platform Tagging

As will be discussed below in greater detail, social platform promotion process 10 may be configured to allow clients to search social platform pool 56 to identify one or more social platforms (defined within social platform pool 56) that may be of interest to the client for various reasons. Accordingly and to enable a more efficient search, each of the social platforms included within social platform pool 56 may be "tagged" to define/categorize them.

Figure 4:
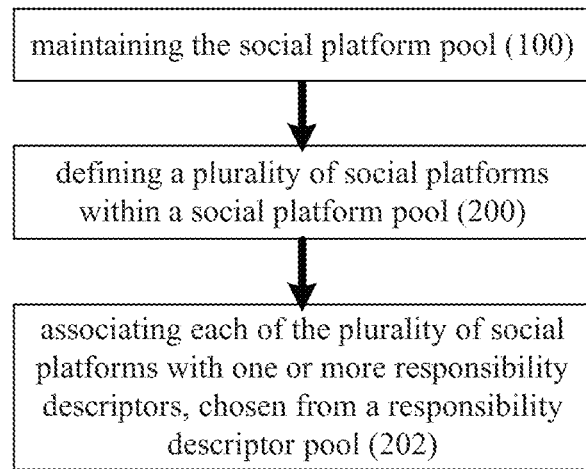
FIG. 4 is a flowchart of another implementation of the social platform promotion process of FIG. 1 according to an embodiment of the present disclosure.

Referring also to FIG. 4 and as discussed above, social platform pool 56 may be maintained 100 by social platform promotion process 10 (e.g., within a data structure such as storage device 16 coupled to computing device 12). Further and as discussed above, social platform promotion process 10 may define 200 a plurality of social platforms (e.g., plurality of social platforms 58) within social platform pool 56, wherein plurality of social platforms 58 defined within social platform pool 56 may be a plurality of prevetted social platforms (e.g., vetted in the manner discussed above).

In order to provide a level of exclusivity with respect to the social platforms (e.g., plurality of social platforms 58) defined within social platform pool 56, this plurality of prevetted social platforms (e.g., plurality of social platforms 58) may include one or more contract-bound prevetted social platforms and/or one or more license-bound prevetted social platforms.

For example, some or all of plurality of social platforms 58 may be under contract with the owner/assignee/licensee of social platform promotion process 10, thus allowing social platform promotion process 10 to provide to its clients exclusive access to one or more of plurality of social platforms 58. As would be expected, various types of contracts may be utilized to associate some or all of plurality of social platforms 58 with social platform promotion process 10, examples of which may include but are not limited to long-term contracts, short-term contracts, perpetual contracts, auto-renewing contracts, and renegotiable contracts.

Further, some or all of plurality of social platforms 58 may be under license with the owner/assignee/licensee of social platform promotion process 10, thus allowing social platform promotion process 10 to provide to its clients exclusive access to one or more of plurality of social platforms 58. As would be expected, various types of licenses may be utilized to associate some or all of plurality of social platforms 58 with social platform promotion process 10, examples of which may include but are not limited to long-term licenses, short-term licenses, perpetual licenses, auto-renewing licenses, and renegotiable licenses.

Social platform promotion process 10 may associate 202 each of the plurality of social platforms (e.g., plurality of social platforms 58) with one or more responsibility descriptors, chosen from a responsibility descriptor pool (e.g., responsibility descriptor pool 66). The one or more responsibility descriptors (that are associated 202 with a social platform and are defined within responsibility descriptor pool 66) may identify one or more portions of a responsibility score that may be positively impacted when a contribution is made to the associated social platform.

As is used in this document and as is known in the art, a responsibility score may define the manner in which a client (e.g. a corporation or business entity) is viewed with respect to their social responsibility. For example, a current responsibility score associated with the client may include one or more of: an environmental score; a social score; and a governance score. One example of such a responsibility score is an ESG score. As is known in the art, an ESG score is defined using various ESG scoring criteria.

Environmental, Social and Governance (ESG) criteria is a set of standards for a company's operations that socially conscious investors use to screen potential investments. Environmental criteria look at how a company performs as a steward of the natural environment. Social criteria examine how a company manages relationships with its employees, suppliers, customers and the communities where it operates. Governance deals with a company's leadership, executive pay, audits, internal controls and shareholder rights.

Environmental, social and corporate governance (ESG) criteria refer to three main factors investors consider with regards to a firm's ethical impact and sustainable practices. The criteria are used in ESG investing, also sometimes referred to as sustainable, responsible and impact investing or socially responsible investing. Examples of ESG criteria used by investors include determining a company's impact on climate change or carbon emissions, water use or conservation efforts, anti-corruption policies, board diversity, human rights efforts and community development.

Investors who want to purchase securities that have been screened for ESG criteria can do so through socially responsible mutual funds and exchange-traded funds. According to the US SIF Foundation, the value of ESG funds totaled more than $2.5 trillion by the end of 2016, while U.S. investments in companies that actively pursue responsible, sustainable growth accounted for about $8.7 trillion in assets under management (AUM) at the end of 2015.

What constitutes an acceptable set of ESG criteria is subjective, so investors will need to do the research to find investments that match their own values. Apart from the ethical component, ESG standards are developed to help investors avoid firms at risk of suffering tangible losses as a result of their ESG practices as evidenced by BP's 2010 oil spill and Volkswagen's emissions scandal, both of which rocked the firms' stock prices and resulted in billions of dollars in associated losses.

Environmental criteria may look at a company's energy use, waste, pollution, natural resource conservation and animal treatment. They also evaluate which environmental risks might affect a company's income and how the company is managing those risks. For example, a company might face environmental risks related to its ownership of contaminated land, its disposal of hazardous waste, its management of toxic emissions or its compliance with the government's environmental regulations.

Social criteria may look at the company's business relationships. Does it work with suppliers that hold the same values that the company claims to hold? Does the company donate a percentage of its profits to the community or perform volunteer work? Do the company's working conditions show a high regard for its employees' health and safety? Are stakeholders' interests taken into consideration?

With regard to governance, investors may want to know that a company uses accurate and transparent accounting methods, and they want to see that common stockholders are allowed to vote on important issues. They also want companies to avoid conflicts of interest in their choice of board members. Finally, they prefer not to invest in companies that engage in illegal behavior or use political contributions to obtain favorable treatment.

While the above description of ESG criteria may define an example of what may makeup all or portion of a responsibility score, this is for illustrative purposes only and is not intended to be a limitation of this disclosure. Accordingly, it is understood that other criteria may be considered when defining the responsibility score for a client (e.g., a corporation or business entity). Additionally, some or all of the ESG criteria may be ignored/disregarded when defining the responsibility score for a client (e.g., a corporation or business entity). Accordingly it is understood that (as used in this document) a responsibility score is intended to mean a score that relates to the manner in which a client may be viewed with respect to their social responsibility.

As discussed above, assume that social platform 64 within social platform pool 56 is a social platform that installs solar panels on the roofs of houses owned by low income families. Further as discussed above, social platform 64 may have a positive impact with respect to employment, job training, social dependency, and tax revenue. Accordingly, social platform promotion process 10 may associate 202 four responsibility descriptors (namely employment, job training, social dependency, and tax revenue) with social platform 64 (wherein these four responsibility descriptors were chosen from responsibility descriptor pool 66). It is understood that these responsibility descriptors are for illustrative purposes only and are not intended to be a limitation of this disclosure, as other configurations are possible. For example, the granularity of such responsibility descriptors may be increased or decreased depending upon the design criteria of social platform promotion process 10. Additionally, other responsibility descriptors may be added to and/or removed from responsibility descriptor pool 66. For example, other responsibility descriptors that may be associated with social platform 64 may include: reduced carbon emissions, greenhouse gas reduction, and green power (due to social platform 64 installing solar cells); poverty reduction (due to social platform 64 providing services to low income homeowners); and environmental stewardship (due to social platform 64 achieving a high level of efficiency for a green energy project).

Searching the Social Platform Pool

As discussed above, social platform pool 56 may be maintained 100 by social platform promotion process 10 (e.g., within a data structure such as storage device 16 coupled to computing device 12). Further and as discussed above, social platform promotion process 10 may define 200 a plurality of social platforms (e.g., plurality of social platforms 58) within social platform pool 56, wherein plurality of social platforms 58 defined within social platform pool 56 may be a plurality of prevetted social platforms (e.g., vetted in the manner discussed above Accordingly, one or more clients of social platform promotion process 10 may search social platform pool 56 in order to identify one or more social platforms to which they would like to make a contribution. For example, assume that client 38 is a CSR manager for fast food corporation 68 (e.g. ABC Burgers). Further assume that client 38 uses social platform promotion process 10 to identify one or more social platforms to which the fast food corporation 68 may wish to make a contribution. As is known in the art, a CSR manager of a company may have the job of predicting social and environmental risks that the company may face in the future (and making corporate decisions that may mitigate such social and environmental risks and bolster the corporations perceived social responsibility. Accordingly and in such a situation, client 38 (a CSR manager) may utilize social platform promotion process 10 to identify one or more social platforms to which fast food corporation 68 may make contributions to better their perceived social responsibility.

Proactive Searching of Pool

Accordingly in continuing with the above stated example, assume that client 38 initiates an inquiry with respect to social platform pool 56. Further assume that, as the CSR manager for fast food corporation 68, client 38 is cognizant of the fact that fast food corporations typically have perceived issues (with respect to responsibility scores) in areas such as: childhood obesity (due to the high level of calories included within fast food); single-use plastics (due to the use of Styrofoam containers and plastic drinking straws); and greenhouse gas emissions (due to the environmental concerns with raising cattle). Accordingly, assume for this illustrative example that client 38 is interested in identifying social platforms that may address the concerns of fast food corporation 68 with respect to childhood obesity, single-use plastics and greenhouse gas emissions. Accordingly, client 38 may generate social platform inquiry 70 that may be provided to social platform promotion process 10.

Figure 5:
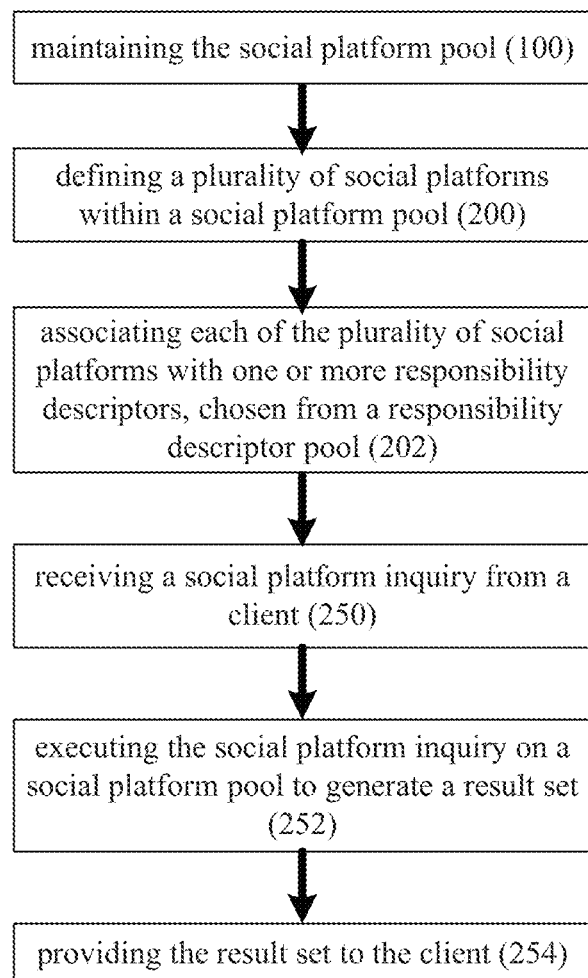
FIG. 5 is a flowchart of another implementation of the social platform promotion process of FIG. 1 according to an embodiment of the present disclosure.

Referring also to FIG. 5, social platform promotion process 10 may receive 250 a social platform inquiry (e.g., social platform inquiry 70) from a client (e.g. client 38), wherein social platform promotion process 10 may execute 252 the social platform inquiry (e.g., social platform inquiry 70) on social platform pool 56 to generate a result set (e.g., result set 72), which may be provided 254 to the client (e.g., client 38). Result set 72 may be chosen from the plurality of prevetted social platforms (e.g., plurality of social platforms 58).

As discussed above, in order to provide a level of exclusivity with respect to the social platforms (e.g., plurality of social platforms 58) defined within social platform pool 56, this plurality of prevetted social platforms (e.g., plurality of social platforms 58) may include one or more contract-bound prevetted social platforms and/or one or more license-bound prevetted social platforms.

As discussed above, social platform promotion process 10 may associate 202 each of the plurality of social platforms (e.g., plurality of social platforms 58) included within social platform pool with one or more responsibility descriptors (chosen from responsibility descriptor pool 66), wherein these responsibility descriptors may identify one or more portions of a responsibility score that may be positively impacted when a contribution is made to the associated social platform.

Accordingly, result set 72 may identify six social platforms that client 38 (the CSR manager of fast food corporation 68) may be interested in making a contribution to (namely two social platforms that combat childhood obesity, two social platforms that address single-use plastics, and two social platforms that address greenhouse gas emissions). Specifically, these six social platforms may be included within result set 72 because they include responsibility descriptors that correspond with the issues facing the fast food industry, namely childhood obesity, single-use plastics, and greenhouse gas emissions.

Reactive Searching of the Pool

While the above-described example concerned a situation in which client 38 was cognizant of the fact that fast food corporations typically have perceived issues in areas of e.g., childhood obesity; single-use plastics; and greenhouse gas emissions, this example was for illustrative purposes only and is not intended to be a limitation of this disclosure, as other configurations are possible. For example, social platform promotion process 10 may be configured to reactively search social platform pool 56 in response to a client engaging social platform promotion process 10.

Accordingly, assume for this illustrative example that client 38 is not aware (or only somewhat aware) of the manner in fast food corporations are perceived with respect to their social responsibility. Assume that client 38 utilizes social platform promotion process 10 to identify the issues that fast food corporation 68 may specifically have with respect to their perceived social responsibility. Accordingly, client 38 may visit e.g. a website/portal operated by social platform promotion process 10 that may allow client 38 to identify themselves as a business entity (e.g. fast food corporation 68, namely ABC Burgers), wherein client 38 may request that social platform promotion process 10 make recommendations concerning one or more social platforms to which fast food corporation 68 may wish to make contributions. Accordingly, these actions may result in the generation of social platform inquiry 70 that may be provided to social platform promotion process 10.

Figure 6:
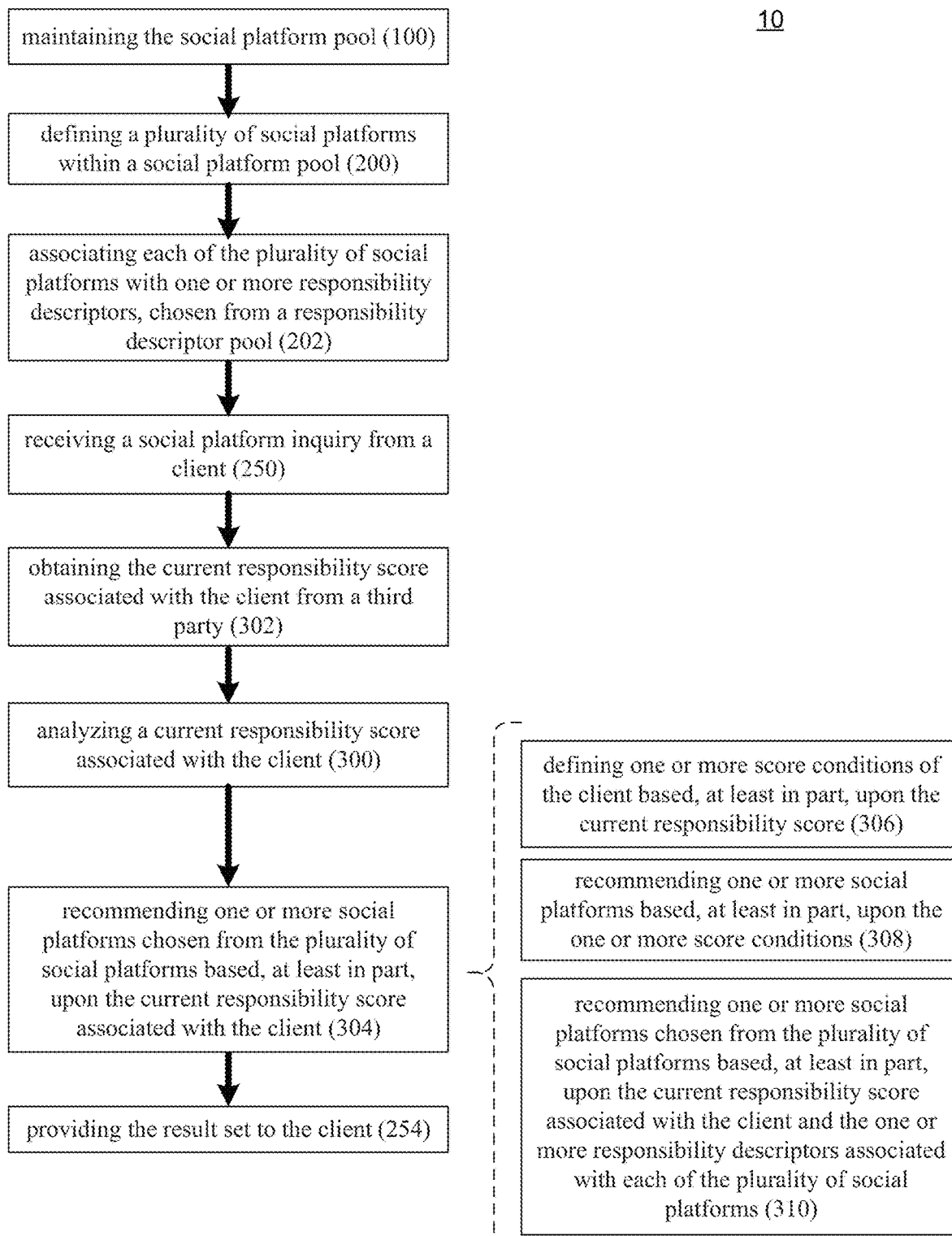
FIG. 6 is a flowchart of another implementation of the social platform promotion process of FIG. 1 according to an embodiment of the present disclosure.

Referring also to FIG. 6, social platform promotion process 10 may receive 250 the social platform inquiry (e.g., social platform inquiry 70) from a client (e.g. client 38) and may analyze 300 a current responsibility score (e.g., current responsibility score 74) associated with the client (e.g., client 38, the CSR manager of fast food corporation 68).

As discussed above and as used in this document, a responsibility score (e.g., current responsibility score 74) may define the manner in which a client (e.g. fast food corporation 68) is currently viewed with respect to their social responsibility, wherein a responsibility score (e.g., current responsibility score 74) associated with the client (e.g. fast food corporation 68) may include one or more of: an environmental score; a social score; and a governance score.

The responsibility score (e.g., current responsibility score 74) associated with the client (e.g. fast food corporation 68) need not be organically generated/maintained by social platform promotion process 10 and may be obtained 302 from a third party (e.g., third-party 76). Examples of third-party 76 may include but is not limited to one or more rating agencies such as MSCI, Thomson-Reuters, and Sustainalytics.

Once obtained 302 (if it needs to be obtained), social platform promotion process 10 may analyze 300 the current responsibility score (e.g., current responsibility score 74) associated with the client (e.g., client 38) and may recommend 304 one or more social platforms based, at least in part, upon the current responsibility score (e.g., current responsibility score 74) associated with the client (e.g. client 38).

Upon making the above-described recommendations, social platform promotion process 10 may generate a result set (e.g., result set 72), which (as discussed above) may be provided 254 to the client (e.g., client 38). Result set 72 may define one or more social platforms that may be chosen from the plurality of prevetted social platforms (e.g., plurality of social platforms 58) defined within social platform pool 56. As discussed above, social platform pool 56 may be maintained 100 by social platform promotion process 10 (e.g., within a data structure such as storage device 16 coupled to computing device 12).

As discussed above, social platform promotion process 10 may associate 202 each of the plurality of social platforms (e.g., plurality of social platforms 58) included within social platform pool 56 with one or more responsibility descriptors (chosen from responsibility descriptor pool 66), wherein these responsibility descriptors may identify one or more portions of a responsibility score that may be positively impacted when a contribution is made to the associated social platform.

Assume that, upon social platform promotion process 10 analyzing 300 the current responsibility score 74 associated with client 38, social platform promotion process 10 determines that fast food corporation 68 is perceived as having poor social responsibility with respect to the same three issue discussed above (childhood obesity; single-use plastics; and greenhouse gas emissions). Accordingly and in this example, social platform promotion process 10 may define 306 one or more score conditions of the client (e.g., client 38) based, at least in part, upon current responsibility score 74. Assume for this example that social platform process 10 defines 306 three conditions (e.g., a childhood obesity deficiency; a single-use plastics deficiency; and greenhouse gas emissions deficiency) within responsibility score 74 of client 38.

Continuing with the example in which three conditions were defined with respect to current responsibility score 74 of client 38, when recommending 304 one or more social platforms based, at least in part, upon the current responsibility score (e.g., current responsibility score 74) associated with the client (e.g. client 38), social platform promotion process 10 may recommend 308 one or more social platforms based, at least in part, upon the one or more score conditions (e.g., a childhood obesity deficiency; a single-use plastics deficiency; and greenhouse gas emissions deficiency). Specifically, social platform promotion process 10 may determine which of the social platforms defined within social platform pool 56 include responsibility descriptors that are associated with e.g., childhood obesity; single-use plastics; and greenhouse gas emissions and may recommend 308 those social platforms.

Further and when recommending 304 one or more social platforms based, at least in part, upon the current responsibility score (e.g., current responsibility score 74) associated with the client (e.g. client 38), social platform promotion process 10 may recommend 310 one or more social platforms chosen from plurality of social platforms 58 based, at least in part, upon current responsibility score 74 associated with client 38 and the one or more responsibility descriptors (as discussed above) associated with each of plurality of social platforms 58.

So summing up, social platform promotion process 10 may recommend 304 one or more social platforms based, at least in part, upon the current responsibility score (e.g., current responsibility score 74) associated with the client (e.g. client 38), alone or in combination with the above-described one or more score conditions. Social platform promotion process 10 may then generate a result set (e.g., result set 72) that may be provided 254 to client 38. As discussed above, assume that result set 72 identifies six social platforms that client 38 (the CSR manager of fast food corporation 68) may be interested in making a contribution to (namely two social platforms that combat childhood obesity, two social platforms that address single-use plastics, and two social platforms that address greenhouse gas emissions).

While in the above-described example, the one or more score conditions defined 306 by social platform promotion process 10 for client 38 based, at least in part, upon current responsibility score 74 are described as being "negative" conditions (e.g., a childhood obesity deficiency; a single-use plastics deficiency; and greenhouse gas emissions deficiency), this is for illustrative purposes only and is not intended to be a limitation of this disclosure, as other configurations are possible and are considered to be within the scope of this disclosure.

For example, the one or more score conditions defined 306 by social platform promotion process 10 for client 38 with respect to current responsibility score 74 may include "positive" conditions. Accordingly, social platform promotion process 10 may define 306 one or more "positive" condition for client 38. As discussed above and in this example, current responsibility score 74 indicated that client 38 had perceived social responsibility issues in areas of childhood obesity; single-use plastics; and greenhouse gas emissions (the "negative" conditions). Additionally/alternatively, current responsibility score 74 may also indicate that client 38 has perceived social responsibility accolades in areas of education (as client 38 makes generous contributions to after-school programs), public health (as client 38 sponsors a juvenile cancer treatment center), and veteran affairs (as client 38 funds a program that provides assistance to homeless veterans).

Identity-Based Searching of the Pool

While the above-described example concerned a situation in which client 38 was not aware (or only somewhat aware) of the manner in fast food corporations are perceived with respect to their social responsibility but was employed by an entity (e.g. fast food corporation 68, namely ABC Burgers) having a current responsibility score (e.g., current responsibility score 74), there may be situations in which the client does not have a current responsibility score. For example, the client may be a new company or an established company for which a current responsibility score simply has never been calculated.

For this example, assume that client 42 is the President of computer corporation 78 (e.g. XYZ Computers), a relatively new computer corporation. Further assume that client 42 is not aware (or only somewhat aware) of the manner in computer corporations are perceived with respect to their social responsibility. Accordingly, client 42 may utilize social platform promotion process 10 to identify the issues that computer corporation 78 may specifically have with respect to their perceived social responsibility. Accordingly, client 42 may visit e.g. a website/portal operated by social platform promotion process 10 that may allow client 42 to identify themselves as a business entity (e.g. computer corporation 78, namely XYZ Computers), wherein client 42 may request that social platform promotion process 10 make recommendations concerning one or more social platforms to which computer corporation 78 may wish to make contributions to better their perceived social responsibility. Accordingly, these actions may result in the generation of social platform inquiry 80 that may be provided to social platform promotion process 10.

As stated above, computer corporation 78 (e.g. XYZ Computers) is a relatively new computer corporation. Accordingly, assume that a current responsibility score has not yet been established for computer corporation 78. Therefore, when (as discussed above) social platform promotion process 10 attempts to analyze 300 the current responsibility score associated with client 42 (or attempts to obtain 302 the same from third-party 76), social platform promotion process 10 may determine that a current responsibility score does not exist for client 42.

Social platform promotion process 10 may receive 250 the social platform inquiry (e.g., social platform inquiry 80) from a client (e.g. client 42). However, being a current responsibility score does not yet exist for client 42, social platform promotion process 10 will not be able to analyze 300 the same. However, social platform promotion process 10 may be capable of providing the above-described social responsibility analysis for client 42 without requiring that client 42 have a current social responsibility score.

Figure 7:
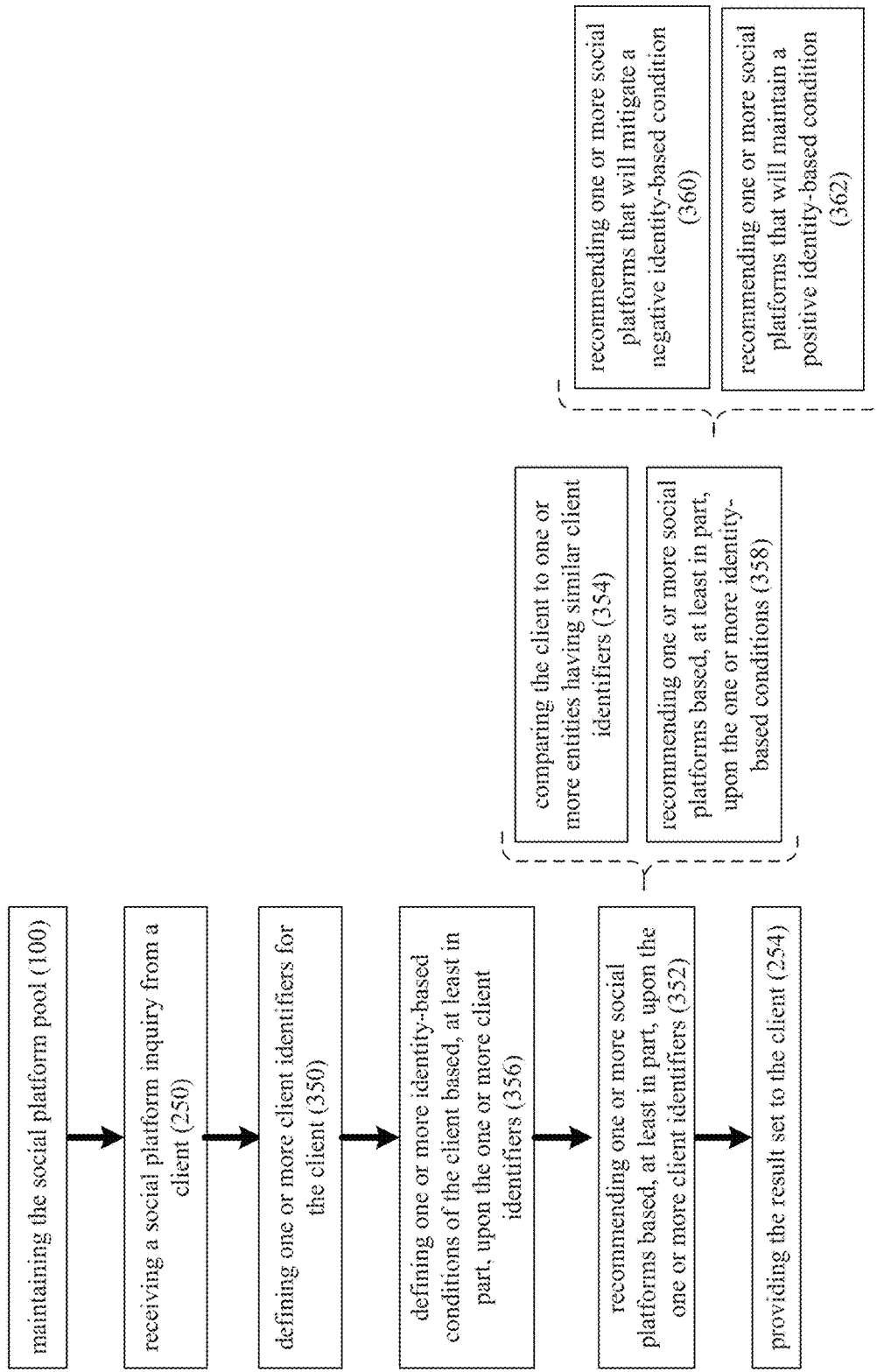
FIG. 7 is a flowchart of another implementation of the social platform promotion process of FIG. 1 according to an embodiment of the present disclosure.

Accordingly and referring also to FIG. 7, social platform promotion process 10 may define 350 one or more client identifiers for client 42, wherein examples of these one or more client identifiers may include but are not limited to: a client sector; a client location; a client size; and/or a client classification. As stated above, client 42 may identify computer corporation 78 (e.g. XYZ Computers) as a newly-formed manufacturer of computers having a primary location in Pasadena, Calif. Accordingly, the client identifiers concerning client sector and client location may be proactively defined/provided by client 42. Social platform promotion process 10 may then proactively research computer corporation 78 (e.g. XYZ Computers) to determine a client classification (e.g., private corporation, publicly traded corporation, market capitalization and tax entity status) and a client size (e.g., number of employees, number of offices, and number of related foreign entities). Alternatively, social platform promotion process 10 may make an inquiry of client 42 to determine such a client classification and/or client size. Assume for this example that is determined (via the client proactively providing the information, the client reactively providing information and/or social platform promotion process 10 locating the information) that computer corporation 78 (e.g. XYZ Computers) is a newly-formed manufacturer of computers having a primary location in Pasadena, Calif. that is a privately held company and employs 100 to 250 people.

Once such client identifiers (e.g. newly-formed manufacturer of computers having a primary location in Pasadena, Calif. that is a privately held company and employs 100 to 250 people) are defined 350 by social platform promotion process 10 for client 42, social platform promotion process 10 may recommend 352 one or more social platforms (chosen from social platform pool 56) based, at least in part, upon the one or more client identifiers defined 350. When recommending 352 one or more social platforms (chosen from social platform pool 56) based, at least in part, upon the one or more client identifiers, social platform promotion process 10 may compare 354 the client (e.g., client 42) to one or more entities having similar client identifiers.

Accordingly, while no current responsibility score is available for computer corporation 78 (e.g. XYZ Computers), social platform promotion process 10 may infer that computer corporation 78 (e.g. XYZ Computers) may be viewed with respect to their social responsibility in a fashion similar to the manner in which other computer corporations (i.e. other corporations having similar client identifiers) are viewed with respect to their social responsibility. Accordingly and when recommending 352 social platforms for client 42 to make contributions to based, at least in part, upon the above-described client identifiers, social platform promotion process 10 may compare 354 client 42 to one or more entities having similar client identifiers.

Assume for this example that social platform promotion process 10 determines that computer corporations in general are deemed to have poor social responsibility in the areas of plastics (due to the extensive use of plastics in manufacturing computers and shipping materials concerning the same) and workplace diversity (due to computer science and engineering being an employment area in which women are underrepresented), but are deemed to have high social responsibility in the areas of technology proliferation (due to computers allowing interaction between diverse groups of people that were typically unable to interact). Accordingly and when recommending 352 social platforms (chosen from social platform pool 56) based, at least in part, upon the one or more client identifiers associated with client 42, social platform promotion process 10 may recommend 352 that client 42 contribute to social platforms that e.g., address the recycling of plastics and/or address workplace diversity issues.

Continuing with the above-stated example, social platform promotion process 10 may define 356 one or more identity-based conditions of client 42 that are based, at least in part, upon the one or more client identifiers (e.g. newly-formed manufacturer of computers having a primary location in Pasadena, Calif. that is a privately held company that employs 100 to 250 people). As discussed above, examples of these identity-based conditions defined 356 by social platform promotion process 10 may include poor perceived social responsibility in the areas of plastics and workplace diversity and high perceived social responsibility in the area technology proliferation. Accordingly and when recommending 352 social platforms (chosen from social platform pool 56) based, at least in part, upon the one or more client identifiers associated with client 42, social platform promotion process 10 may recommend 358 one or more social platforms based, at least in part, upon the one or more identity-based conditions (e.g., poor perceived social responsibility in the areas of plastics and workplace diversity).

When recommending 358 one or more social platforms based, at least in part, upon the one or more identity-based conditions (e.g., poor perceived social responsibility in the areas of plastics and workplace diversity and high perceived social responsibility in the area of technology proliferation), social platform promotion process 10 may recommend 360 one or more social platforms that will mitigate a negative identity-based condition (e.g., social platforms that address the poor perceived social responsibility in the areas of plastics and workplace diversity).

Additionally/alternatively and when recommending 358 one or more social platforms based, at least in part, upon the one or more identity-based conditions (e.g., poor perceived social responsibility in the areas of plastics and workplace diversity and high perceived social responsibility in the area of technology proliferation), social platform promotion process 10 may recommend 362 one or more social platforms that will maintain a positive identity-based condition (e.g., social programs that further bolster the high perceived social responsibility in the area of technology proliferation).

When making recommendations, social platform promotion process 10 may generate a result set (e.g., result set 82), which (as discussed above) may be provided 254 to the client (e.g., client 42). Result set 82 may define one or more social platforms that may be chosen from the plurality of prevetted social platforms (e.g., plurality of social platforms 58) defined within social platform pool 56. As discussed above, social platform pool 56 may be maintained 100 by social platform promotion process 10 (e.g., within a data structure such as storage device 16 coupled to computing device 12).

Since, in this example, social platform promotion process 10 determined that computer corporations in general are deemed to have poor social responsibility in the areas of plastics and workplace diversity, result set 82 may include a) social platform 60 (e.g. Baja Plastics), which is an environmental social platform that recovers water-born plastics from the ocean so that such recovered plastic may be recycled, and b) social platform 84 (e.g., CoderGirls), which is a social platform that promotes and supports females entering STEM fields. Further, since in this example, social platform promotion process 10 determined that computer corporations in general are deemed to have high social responsibility in the areas of technology proliferation, result set 82 may include c) social platform 86 (e.g., Access4All), which is a social platform that promotes free internet access across the developing world.

Closing the Deal

As discussed above, a responsibility score may define the manner in which a client (e.g. a corporation or business entity) is viewed with respect to their social responsibility. For example, a current responsibility score associated with the client may include one or more of: an environmental score; a social score; and a governance score, wherein one example of such a responsibility score is an ESG score. As is known in the art, an ESG score is defined using various ESG scoring criteria.

Further and as discussed above, social platform promotion process 10 may recommend social platforms (chosen from social platform pool 56) that may address perceived social responsibility issues associated with a client, wherein these social responsibility issues may often be identified by social platform promotion process 10 examining a responsibility score. Accordingly, social platform promotion process 10 may be configured to predict how a responsibility score may change when a client contributes to one of the social platforms recommended by social platform promotion process 10.

Predicting Score Change

Figure 8:
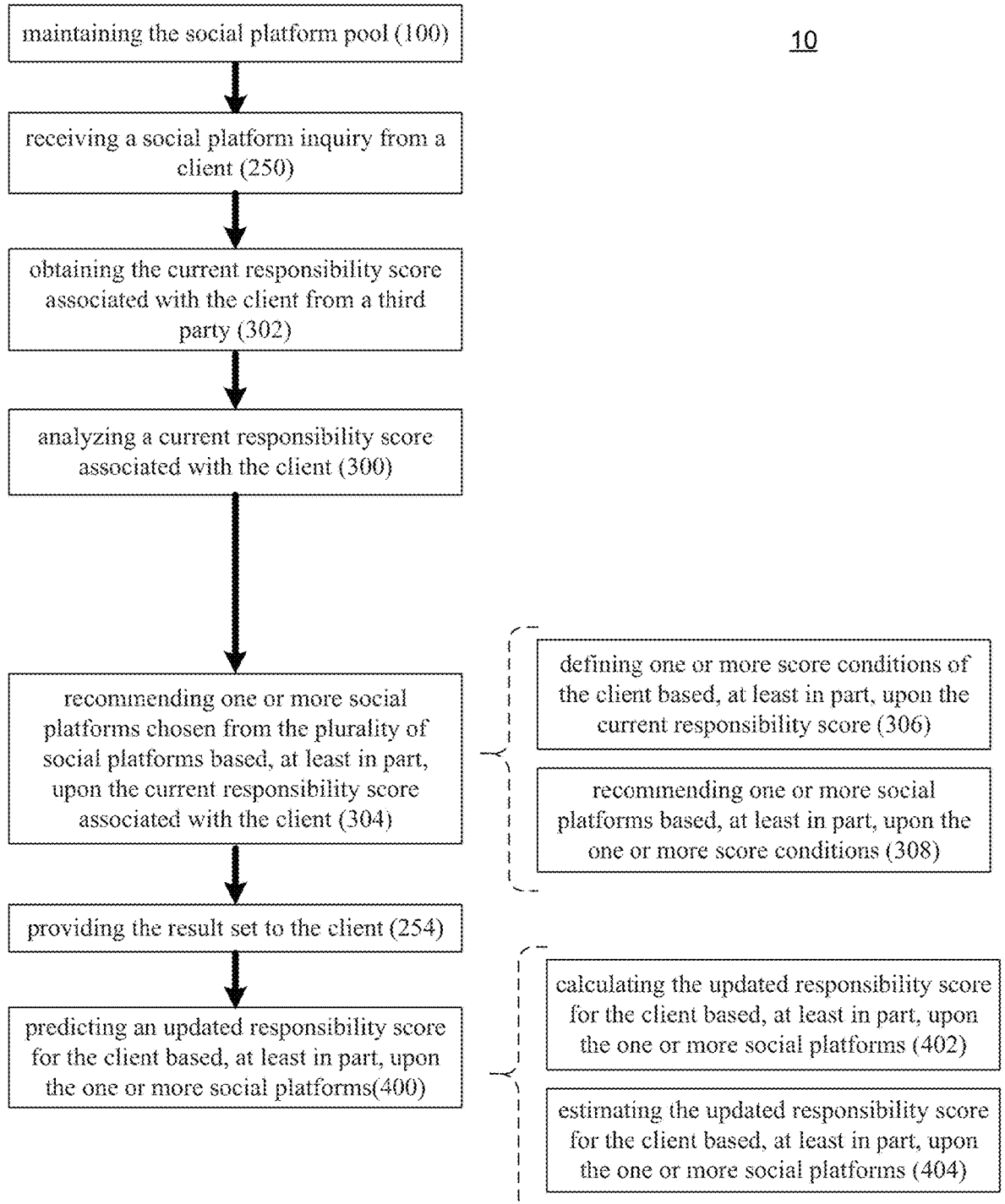
FIG. 8 is a flowchart of another implementation of the social platform promotion process of FIG. 1 according to an embodiment of the present disclosure.

Referring also to FIG. 8 and as discussed above, social platform promotion process 10 may receive 250 a social platform inquiry from a client and may analyze 300 a current responsibility score associated with the client. The responsibility score associated with the client need not be organically generated/maintained by social platform promotion process 10 and may be obtained 302 from a third party (e.g., third-party 76). Social platform promotion process 10 may then recommend 304 one or more social platforms based, at least in part, upon the current responsibility score associated with the client. Social platform promotion process 10 may define 306 one or more score conditions of the client based, at least in part, upon the current responsibility score, wherein social platform promotion process 10 may then recommend 308 one or more social platforms based, at least in part, upon these one or more score conditions.

As discussed above, when making recommendations, social platform promotion process 10 may generate a result set that (as discussed above) may be provided 254 to the client. This result set may define one or more social platforms that may be chosen from the plurality of prevetted social platforms (e.g., plurality of social platforms 58) defined within social platform pool 56. Further and as discussed above, social platform pool 56 may be maintained 100 by social platform promotion process 10 (e.g., within a data structure such as storage device 16 coupled to computing device 12).

Additionally, social platform promotion process 10 may be configured to predict 400 an updated responsibility score for the client based, at least in part, upon the one or more social platforms, thus allowing the client to review the recommendations defined within the result set and allowing the client to make an informed decision concerning which (if any) of the social platforms to make a contribution to.

Returning to the above-stated example in which client 38 is a CSR manager for fast food corporation 68 (e.g. ABC Burgers) who uses social platform promotion process 10 to identify one or more social platforms to which the fast food corporation 68 may wish to make a contribution, client 38 may provide social platform inquiry 70 to social platform promotion process 10.

Social platform promotion process 10 may receive 250 social platform inquiry 70 from client 38 and may analyze 300 a current responsibility score (e.g., current responsibility score 74) associated with the client (e.g., client 38, the CSR manager of fast food corporation 68), wherein current responsibility score 74 may be obtained 302 from third-party 76. As discussed above, examples of third-party 76 may include but is not limited to one or more rating agencies such as MSCI, Thomson-Reuters, and Sustainalytics. Social platform promotion process 10 may then recommend 304 one or more social platforms based, at least in part, upon current responsibility score 74 associated with client 38.

As discussed above, social platform promotion process 10 may define 306 one or more score conditions of client 38 based, at least in part, upon current responsibility score 74, wherein social platform promotion process 10 may then recommend 308 social platforms based, at least in part, upon these one or more score conditions. In the above-described example, social platform process 10 defines 306 three conditions (e.g., a childhood obesity deficiency; a single-use plastics deficiency; and greenhouse gas emissions deficiency) within responsibility score 74 of client 38. Accordingly and when recommending 304 one or more social platforms based, at least in part, upon current responsibility score 74 associated with client 38, social platform promotion process 10 may recommend 308 one or more social platforms based, at least in part, upon the one or more score conditions (e.g., a childhood obesity deficiency; a single-use plastics deficiency; and a greenhouse gas emissions deficiency). Specifically and as discussed above, social platform promotion process 10 may determine which of the social platforms defined within social platform pool 56 include responsibility descriptors that are associated with e.g., childhood obesity; single-use plastics; and greenhouse gas emissions and may recommend 308 those social platforms.

Further and as discussed above, assume that result set 72 identifies six social platforms that client 38 (the CSR manager of fast food corporation 68) may be interested in making a contribution to (namely two social platforms that combat childhood obesity, two social platforms that address single-use plastics, and two social platforms that address greenhouse gas emissions). Unfortunately, if the objective of client 38 making a contribution to one of the social platforms defined within result set 72 is to bolster their responsibility score (e.g., responsibility score 74), client 38 may not know which social platform to make a contribution to (as client 38 may be unsure as to how making a contribution to each of these social platforms will impact responsibility score 74.

Accordingly and in order to assist client 38 in making such a decision, social platform promotion process 10 may be configured to predict 400 an updated responsibility score (e.g., updated responsibility score 74') for the client (e.g., client 38) based, at least in part, upon the one or more social platforms, thus allowing (in this example) client 38 to review the recommendations defined within result set 72 and allow client 38 to make an informed decision concerning which (if any) of the social platforms to make a contribution to.

For example, social platform promotion process 10 may be configured to predict 400 an updated responsibility score (e.g., updated responsibility score 74') for the client (e.g., client 38) based, at least in part, upon the six social platforms defined within result set 72, wherein result set 72 and the predictions may be defined as follows:

| Social Platform | Current Score 74 | Predicted Score 74' | % Increase |
|---|---|---|---|
| Option #1 | 853 | 861 | 0.93% |
| Option #2 | 853 | 872 | 2.22% |

-continued

| Social Platform | Current Score 74 | Predicted Score 74' | % Increase |
|---|---|---|---|
| Option #3 | 853 | 907 | 6.33% |
| Option #4 | 853 | 899 | 5.93% |
| Option #5 | 853 | 923 | 8.20% |
| Option #6 | 853 | 887 | 3.98% |

For example and as shown above in tabular form, social platform promotion process 10 may predict 400 an updated responsibility score (e.g., updated responsibility score 74') for the client (e.g., client 38) based, at least in part, upon the six social platforms defined within result set 72.

Accordingly and as shown above:
choosing social platform #1 (of the six defined within results set 72) may result in an updated responsibility score 74' of 861 (increasing 0.93% from 853);
choosing social platform #2 (of the six defined within results set 72) may result in an updated responsibility score 74' of 872 (increasing 2.22% from 853);
choosing social platform #3 (of the six defined within results set 72) may result in an updated responsibility score 74' of 907 (increasing 6.33% from 853);
choosing social platform #4 (of the six defined within results set 72) may result in an updated responsibility score 74' of 899 (increasing 5.93% from 853);
choosing social platform #5 (of the six defined within results set 72) may result in an updated responsibility score 74' of 923 (increasing 8.20% from 853); and
choosing social platform #6 (of the six defined within results set 72) may result in an updated responsibility score 74' of 887 (increasing 3.98% from 853).

While the predictions made by social platform promotion process 10 are shown above in tabular form, this is for illustrative purposes only and is not intended to be a limitation of this disclosure, as other configurations are possible and are considered to be within the scope of this disclosure. For example, results set 72 may be rendered within a graphical user interface (not shown) by social platform promotion process 10, wherein client 38 may select one of (in this example) the six recommended social platforms and a window may be rendered that shows a predicted updated responsibility score when (in this example) client 38 selects the related social platform.

When predicting 400 an updated responsibility score (e.g., updated responsibility score 74') for client 38 based, at least in part, upon the one or more social platforms, social platform promotion process 10 may calculate 402 the updated responsibility score (e.g., updated responsibility score 74') for client 38 based, at least in part, upon the one or more social platforms; or may estimate 404 the updated responsibility score (e.g., updated responsibility score 74') for client 38 based, at least in part, upon the one or more social platforms.

As stated above, the responsibility score (e.g., current responsibility score 74) associated with the client (e.g. client 38) may be organically generated/maintained by social platform promotion process 10 and may be obtained 302 from a third party (e.g., third-party 76). Accordingly and in the event that the responsibility score (e.g., current responsibility score 74) associated with the client (e.g. client 38) was organically generated/maintained by social platform promotion process 10, social platform promotion process 10 may simply calculate 402 the updated responsibility score (e.g., updated responsibility score 74') for client 38 based, at least in part, upon the one or more social platforms. Further and in the event that the responsibility score (e.g., current responsibility score 74) associated with the client (e.g. client 38) was obtained 302 from a third party (e.g., third-party 76), social platform promotion process 10 may simply have third-party 76 calculate 402 the updated responsibility score (e.g., updated responsibility score 74') for client 38 based, at least in part, upon the one or more social platforms.

Alternatively, in the event that the responsibility score (e.g., current responsibility score 74) associated with the client (e.g. client 38) was obtained 302 from a third party (e.g., third-party 76) and third-party 76 is not available to perform the calculation, social platform promotion process 10 may estimate 404 the updated responsibility score (e.g., updated responsibility score 74') for client 38 based, at least in part, upon the one or more social platforms. For example, social platform promotion process 10 may estimate 404 the values of the updated responsibility score (e.g., updated responsibility score 74') based upon various factors, examples of which may include but are not limited to: experience concerning the amount that responsibility scores have moved in the past, speculation concerning the manner in which responsibility scores are being calculated by third-party 76, and speculation concerning the market reaction to a contribution by client 38.

While in the above-described example, the one or more score conditions defined 306 by social platform promotion process 10 for client 38 based, at least in part, upon current responsibility score 74 are described as being "negative" conditions (e.g., a childhood obesity deficiency; a single-use plastics deficiency; and greenhouse gas emissions deficiency), this is for illustrative purposes only and is not intended to be a limitation of this disclosure, as other configurations are possible and are considered to be within the scope of this disclosure.

For example, the one or more score conditions defined 306 by social platform promotion process 10 for client 38 with respect to current responsibility score 74 may include "positive" conditions. Accordingly, social platform promotion process 10 may define 306 one or more "positive" condition for client 38. As discussed above and in this example, current responsibility score 74 indicated that client 38 had perceived social responsibility issues in areas of childhood obesity; single-use plastics; and greenhouse gas emissions (the "negative" conditions). Additionally/alternatively, current responsibility score 74 may also indicate that client 38 has perceived social responsibility accolades in areas of education (as client 38 makes generous contributions to after-school programs), public health (as client 38 sponsors a juvenile cancer treatment center), and veteran affairs (as client 38 funds a program that provides assistance to homeless veterans).

Incentivizing Higher Contribution

Returning to the above-stated example in which client 38 is a CSR manager for fast food corporation 68 (e.g. ABC Burgers) who uses social platform promotion process 10 to identify one or more social platforms to which the fast food corporation 68 may wish to make a contribution, client 38 may provide social platform inquiry to social platform promotion process 10.

Figure 9:
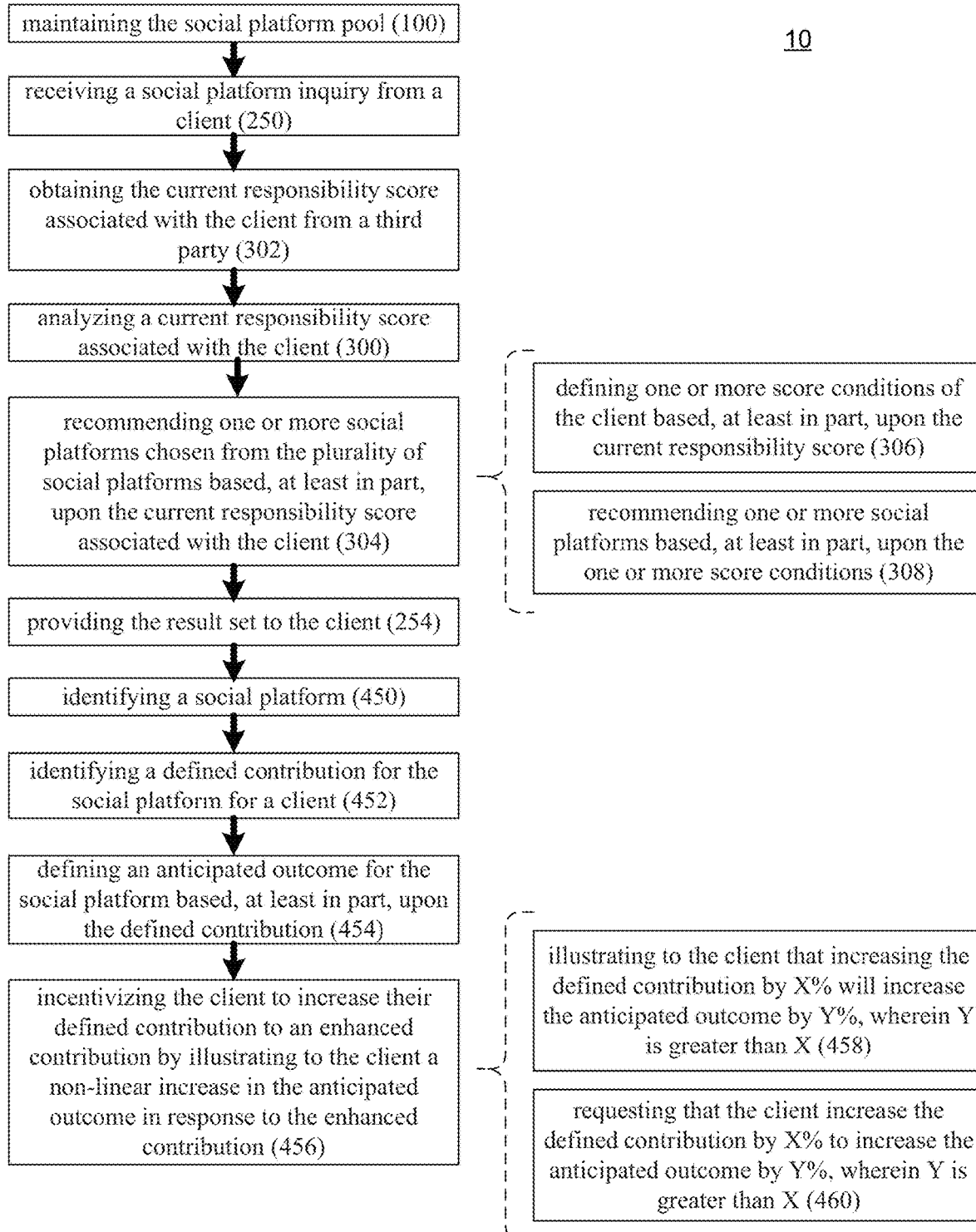
FIG. 9 is a flowchart of another implementation of the social platform promotion process of FIG. 1 according to an embodiment of the present disclosure.

Referring also to FIG. 9, social platform promotion process 10 may receive 250 social platform inquiry 70 from client 38 and may analyze 300 a current responsibility score (e.g., current responsibility score 74) associated with the client (e.g., client 38, the CSR manager of fast food corporation 68), wherein current responsibility score 74 may be (but need not be) obtained 302 from third-party 76. Social platform promotion process 10 may then recommend 304 one or more social platforms based, at least in part, upon current responsibility score 74 associated with client 38.

As discussed above, social platform promotion process 10 may define 306 one or more score conditions of client 38 based, at least in part, upon current responsibility score 74, wherein social platform promotion process 10 may then recommend 308 social platforms based, at least in part, upon these one or more score conditions. In the above-described example, social platform process 10 defines 306 three conditions (e.g., a childhood obesity deficiency; a single-use plastics deficiency; and greenhouse gas emissions deficiency) within responsibility score 74 of client 38. Accordingly and when recommending 304 one or more social platforms based, at least in part, upon current responsibility score 74 associated with client 38, social platform promotion process 10 may recommend 308 one or more social platforms based, at least in part, upon the one or more score conditions (e.g., a childhood obesity deficiency; a single-use plastics deficiency; and a greenhouse gas emissions deficiency). Specifically and as discussed above, social platform promotion process 10 may determine which of the social platforms defined within social platform pool 56 include responsibility descriptors that are associated with e.g., childhood obesity; single-use plastics; and greenhouse gas emissions and may recommend 308 those social platforms.

As discussed above, when making recommendations, social platform promotion process 10 may generate a result set that (as discussed above) may be provided 254 to the client. This result set may define one or more social platforms that may be chosen from the plurality of prevetted social platforms (e.g., plurality of social platforms 58) defined within social platform pool 56. Further and as discussed above, social platform pool 56 may be maintained 100 by social platform promotion process 10 (e.g., within a data structure such as storage device 16 coupled to computing device 12).

Continuing with the above-stated example, result set 72 may identify six social platforms that client 38 may be interested in making a contribution to, wherein client 38 may subsequently select one or more of these (in this example) six social platform to which client 38 makes a contribution.

Accordingly and by making such a selection, social platform promotion process 10 may identify 450 a social platform to which they wish to make a contribution, wherein social platform promotion process 10 may identify 452 a defined contribution for the social platform for a client (e.g., client 38). For example, assume that client 38 wishes to address their single-use plastics deficiency (defined above). As discussed above, client 40 is involved with social platform 60 (e.g. Baja Plastics), which is an environmental social platform that recovers water-born plastics from the ocean so that such recovered plastic may be recycled. Accordingly, assume that Baja Plastics (e.g., client 40) is one of the six social platforms defined within result set 72. Further assume that client 38 selects Baja Plastics (e.g., client 40) as the social platform to which they would like to make a contribution of $100,000. Accordingly, social platform promotion process 10 may identify 450 Baja Plastics (i.e., client 40) as the social platform to which client 38 wishes to make a contribution and may identify 452 $100,000 as the defined contribution amount for the social platform (e.g., social platform 60) for a client (e.g., client 38).

Social platform promotion process 10 may define 454 an anticipated outcome for the social platform (e.g., Baja Plastics) based, at least in part, upon the defined contribution (e.g., $100,000). For example and with respect to the defined contribution of $100,000, social platform promotion process 10 defines 454 an anticipated outcome of recovering 100 tons of water-born plastics. This anticipated outcome may be determined through various methodologies, examples of which may include but are not limited to the past performance of Baja Plastics (i.e., client 40), discussions with Baja Plastics (i.e., client 40), representations made by Baja Plastics (i.e., client 40), and assurances given by Baja Plastics (i.e., client 40).

Accordingly and when deciding how much of a contribution to make to Baja Plastics (i.e., client 40), client 38 will be presented with the anticipated outcome of recovering 100 tons of water-born plastic for the identified $100,000 defined contribution amount. However, and prior to client 38 finalizing the contribution deal, social platform promotion process 10 may incentivize 456 the client (e.g., client 38) to increase their defined contribution (currently at $100,000) to an enhanced contribution by illustrating to client 38 a non-linear increase in the anticipated outcome (currently at 100 tons of water-born plastics) in response to the enhanced contribution.

When incentivizing 456 client 38, social platform promotion process 10 may provide such "incentives" when e.g., client 38 appears ready to submit their contribution, client 38 has submitted their contribution, or when client 38 is identifying 452 their defined contribution amount.

For example and when incentivizing 456 client 38 to increase their defined contribution (currently at $100,000) to an enhanced contribution by illustrating to client 38 a non-linear increase in the anticipated outcome (currently at 100 tons of water-born plastics) in response to the enhanced contribution, social platform promotion process 10 may illustrate 458 to client 38 that increasing the defined contribution by X % will increase the anticipated outcome by Y %, wherein Y is greater than X. Accordingly, social platform promotion process 10 may illustrate 458 (via e.g., a pop-up window or a splash screen) to client 38 that increasing their defined contribution by 100% (i.e., from $100,000 to $200,000) will increase the anticipated outcome by 150% (i.e., from recovering 100 tons of water-born plastic to recovering 250 tons of water-born plastic).

Further and when incentivizing 456 client 38 to increase their defined contribution (currently at $100,000) to an enhanced contribution by illustrating to client 38 a non-linear increase in the anticipated outcome (currently at 100 tons of water-born plastics) in response to the enhanced contribution, social platform promotion process 10 may request 460 that client 38 increase the defined contribution by X % to increase the anticipated outcome by Y %, wherein Y is greater than X. Accordingly, social platform promotion process 10 may request 460 that client 38 increase their defined contribution by 100% (i.e., from $100,000 to $200,000) so that Baja Plastics (i.e., client 40) may increase their anticipated outcome by 150% (i.e., from recovering 100 tons of water-born plastic to recovering 250 tons of water-born plastic).

While in the above-described example, the one or more score conditions defined 306 by social platform promotion process 10 for client 38 based, at least in part, upon current responsibility score 74 are described as being "negative" conditions (e.g., a childhood obesity deficiency; a single-use plastics deficiency; and greenhouse gas emissions deficiency), this is for illustrative purposes only and is not intended to be a limitation of this disclosure, as other configurations are possible and are considered to be within the scope of this disclosure.

For example, the one or more score conditions defined 306 by social platform promotion process 10 for client 38 with respect to current responsibility score 74 may include "positive" conditions. Accordingly, social platform promotion process 10 may define 306 one or more "positive" condition for client 38. As discussed above and in this example, current responsibility score 74 indicated that client 38 had perceived social responsibility issues in areas of childhood obesity; single-use plastics; and greenhouse gas emissions (the "negative" conditions). Additionally/alternatively, current responsibility score 74 may also indicate that client 38 has perceived social responsibility accolades in areas of education (as client 38 makes generous contributions to after-school programs), public health (as client 38 sponsors a juvenile cancer treatment center), and veteran affairs (as client 38 funds a program that provides assistance to homeless veterans).

Funding the Social Platforms

As discussed above, social platform promotion process 10 may receive 250 a social platform inquiry from a client and may analyze 300 a current responsibility score associated with the client. The responsibility score associated with the client need not be organically generated/maintained by social platform promotion process 10 and may be obtained 302 from a third party (e.g., third-party 76). Social platform promotion process 10 may then recommend 304 one or more social platforms based, at least in part, upon the current responsibility score associated with the client. Social platform promotion process 10 may define 306 one or more score conditions of the client based, at least in part, upon the current responsibility score, wherein social platform promotion process 10 may then recommend 308 one or more social platforms based, at least in part, upon these one or more score conditions.

As discussed above, when making recommendations, social platform promotion process 10 may generate a result set that (as discussed above) may be provided 254 to the client. This result set may define one or more social platforms that may be chosen from the plurality of prevetted social platforms (e.g., plurality of social platforms 58) defined within social platform pool 56. Further and as discussed above, social platform pool 56 may be maintained 100 by social platform promotion process 10 (e.g., within a data structure such as storage device 16 coupled to computing device 12).

The use of social platform promotion process 10 may have numerous beneficiaries. As discussed above, the plurality of social platforms 58 included within social platform pool 56 may benefit from the use of social platform promotion process 10, in that various clients of social platform promotion process 10 may make contributions to the social platforms defined within social platform pool 56.

However, other entities may also be beneficiaries of social platform promotion process 10. For example, assume that broadcasting company 88 (e.g., FNBS Broadcasting) operates and/or is associated with social platform promotion process 10. As will be discussed below in greater detail, broadcasting company 88 may be configured to increase their revenue (through the use of social platform promotion process 10) by encouraging their clients to make contributions to the social platforms defined within social platform pool 56.

For example and as would be expected, broadcasting company 88 may generate revenue by selling advertisements. Accordingly, various clients of broadcasting company 88 may enter into contracts with broadcasting company 88 to provide advertising services (often referred to as ad buys). For example, one client may enter into a $1,000,000 television advertising campaign, wherein broadcasting company 88 may produce television-based advertisement content for the client and may broadcast the same. Further, another client may enter into a $300,000 radio advertising campaign wherein broadcasting company 88 may produce radio-based advertisement content for the client and may broadcast the same.

As would be expected, there is always plenty of competition in the business arena, and this holds especially true with respect to broadcasting companies. Accordingly, it is highly desirable for broadcasting company 88 to lure advertising dollars away from their competitors while avoiding their competitors luring advertising dollars away from broadcast company 88. Therefore, any tool that would result in clients looking more favorably upon broadcasting company 88 when it is time to spend advertising dollars would be highly beneficial to broadcasting company 88. Fortunately, social platform promotion process 10 may be configurable in a manner that would accomplish this highly-desirable task.

Specifically, all discussions of social platform promotion process 10 thus far have concerned a contribution being made to one or more of the social platforms defined within social platform pool 56. However, the source of the funds concerning this contribution was never defined. Naturally, it could occur in a "traditional" manner in which the client (i.e., the party who wishes to enhance their responsibility score) may directly make the contribution to a social platform chosen from social platform pool 56. However, social platform promotion process 10 may be configured in such a way that a portion of an advertisement campaign (e.g., between a client and broadcasting company 88) may be used to fund contributions to the social platform defined within social platform pool 56.

Accordingly, to incentivize clients to advertise with (in this example) broadcasting company 88, broadcasting company 88 may offer to take a defined percentage of an advertising campaign and use that money to contribute to social platforms that may benefit the responsibility score of the client engaging in the advertising campaign with broadcast company 88.

As discussed above, fast food corporation 68 (e.g. ABC Burgers) has a perceived social responsibility issue with respect to three specific areas (e.g., childhood obesity; single-use plastics; and greenhouse gas emissions. Accordingly, assume for this example that fast food corporation 68 (e.g. ABC Burgers) is about to enter into a one million-dollar advertising campaign with a broadcasting company. Assume that, in addition to broadcasting company 88, fast food corporation 68 (e.g. ABC Burgers) is also talking to several competitors of broadcasting company 88. Accordingly, it may be highly desirable for broadcasting company 88 to be able to differentiate themselves with respect to their competitors.

Accordingly, broadcasting company 88 may have a promotion wherein broadcasting company 88 agrees to contribute 10% of all advertising campaigns to one of the social platforms defined within social platform pool 56. Therefore and due to this promotion, fast food corporation 68 may agree to a $1,000,000 advertising campaign with broadcasting company 88 on the premise that broadcasting company 88 will contribute 10% (i.e., $100,000) of that $1,000,000 advertising campaign to a social platform that fast food corporation 68 may select from social platform pool 56. Accordingly, client 38 (i.e., the CSR manager of fast food corporation 68) may:

- visit e.g. the website/portal operated by social platform promotion process 10 so that client 38 may determine what issues fast food corporation 68 has with respect to their perceived social responsibility (in the manner described above);
- research the various social platforms included within social platform pool 56 (in the manner described above);
- identify one or more social platforms that may address any perceived social responsibility issues concerning fast food corporation 68 (in the manner described above); and
- contribute (in this example) the $100,000 that is being provided by broadcasting company 88 as a portion of the advertising campaign that fast food corporation 68 entered into with broadcasting company 88.

When the above-stated $100,000 contribution is made with respect to one or more social platforms defined within social platform pool 56, this contribution may be made in the name of fast food corporation 68, thus allowing fast food corporation 68 to receive the social responsibility benefit of making such a contribution. Further, this contribution may also benefit broadcasting company 88.

Gross-Level Funding

As is known in the art, companies and corporations often have, included within an annual budget, CSR (i.e., corporate social responsibility) funds, wherein (in this example) broadcasting company 88 may use these CSR funds for various projects and expenditures that may bolster the perceived social responsibility of broadcasting company 88. Accordingly, these funds may have already been set aside (and budgeted for) corporate social responsibility spending. Therefore, broadcasting company 88 may use (in this example) $100,000 of those budgeted CSR funds to pay for the contribution being made on behalf of fast food corporation 68 to one or more of the social platforms defined within social platform pool 56. Accordingly, both fast food corporation 68 and broadcasting company 88 may benefit from this $100,000 contribution to one or more social platforms included within social platform pool 56.

Additionally and as is known in the art, companies and corporations also often have, included within an annual budget, sales incentive funds, wherein (in this example) broadcasting company 88 may use these sales incentive funds on various promotions, examples of which may include but are not limited to: free product shipping; free extended warranties; free upgrades; free customer support; and free customer service. Accordingly, these funds may have already been set aside (and budgeted for) sales incentive spending. Therefore, broadcasting company 88 may use (in this example) $100,000 of those budgeted sales incentive funds to pay for the contribution being made on behalf of fast food corporation 68 to one or more of the social platforms defined within social platform pool 56.

Accordingly and through the use of the above-described funds, contributions may be made to one or more social platforms included within social platform pool 56 at the gross revenue level (as opposed to at the net-net revenue level).

Often times, when X % of a revenue portion is used to fund a social platform, the dollar amount associated with that X % is calculated at the net-net level. Unfortunately, this can have a severely detrimental impact on the quantity of funds that the social platform being funded receives. For example and with respect to the $1,000,000 advertising campaign, assume that broadcasting company 88 has $500,000 in expenses associated with performing the $1,000,000 advertising campaign (thus resulting in a first net value of $500,000). On this remaining $500,000, broadcasting company 88 may pay $150,000 in taxes, resulting in a net-net value of $350,000. If broadcasting company 88 funded the selected social platform with 10% of this net-net $350,000 value, the social platform would only receive $35,000. However, if broadcasting company 88 funded the selected social program with 10% of the gross $1,000,000 value, the social platform would receive $100,000.

Continuing with the above-stated example, assume that (after much research) client 38 (i.e., the CSR manager of fast food corporation 68) decides that fast food corporation 68 would like to contribute their $100,000 to social platform 60 (e.g. Baja Plastics), which is an environmental social platform that recovers water-born plastics from the ocean so that such recovered plastic may be recycled.

Figure 10:
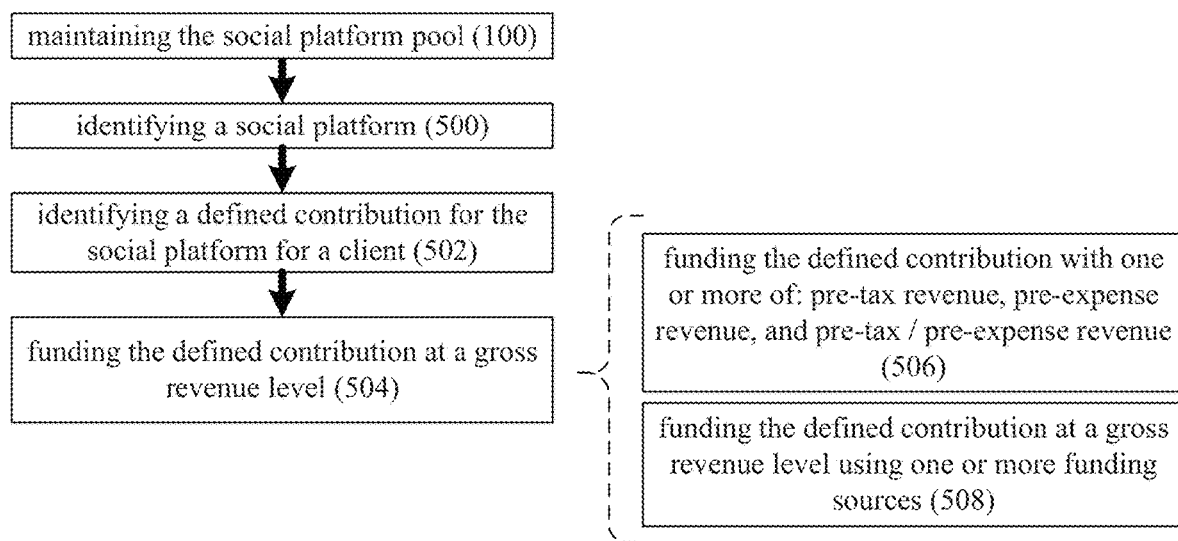
FIG. 10 is a flowchart of another implementation of the social platform promotion process of FIG. 1 according to an embodiment of the present disclosure.

Accordingly and referring also to FIG. 10, social platform promotion process 10 may identify 500 a social platform (i.e., social platform 60) as the social platform to which client 38 would like to make a contribution. As discussed above, broadcasting company 88 has agreed to contribute 10% of the $1,000,000 advertising campaign purchased by fast food corporation 68 to the social platform of their choosing (as selected from social platform pool 56). Accordingly, social platform promotion process 10 may identify 502 a defined contribution (i.e., $100,000) for the social platform (i.e., social platform 60) for a client (i.e., client 38, the CSR manager of fast food corporation 68), wherein this defined contribution is a percentage of a purchase made by the client (i.e., client 38, the CSR manager of fast food corporation 68).

Further, social platform promotion process 10 may fund 504 the defined contribution (i.e., $100,000) at a gross revenue level, wherein funding 504 the defined contribution at a gross revenue level (i.e., as opposed to the net-net level) results in funding 506 the defined contribution (i.e., $100,000) with one or more of: pre-tax revenue, pre-expense revenue, and pre-tax/pre-expense revenue. As discussed above, when e.g. social platform 60 is funded at the net-net level, the quantity of funding received by the social platform is adversely impacted. Accordingly, by funding social platform 60 at the gross level (be it with pre-tax revenue, pre-expense revenue or pre-tax/pre-expense revenue), the quantity of funding received by social platform 60 will be enhanced.

When funding 504 the defined contribution (i.e., $100,000) at a gross revenue level, social platform promotion process 10 may fund 508 the defined contribution (i.e., $100,000) at a gross revenue level using one or more funding sources. As discussed above, examples of such one or more funding sources may include but are not limited to: a corporate social responsibility (CSR) funding source; and a sales incentive funding source.

As discussed above, funding 504 the defined contribution (i.e., $100,000) at a gross revenue level has a tremendous financial benefit, as (in this example) the social platform will receive $100,000 (as opposed to $35,000). As can be easily understood, when funding 504 the defined contribution (i.e., $100,000) at a gross revenue level, it has an impact similar to funding a tax-deferred retirement plan (such as a 401k or an IRA) with pretax dollars as opposed to funding a traditional savings account with post-tax dollars. For example, if an individual is in the upper income tax bracket and has $10,000 to place into either a tax-deferred retirement account or a traditional (i.e., post-tax) savings account, the benefits of using the former become readily apparent. For example, if the individual deposited $10,000 into a tax-deferred retirement account, the amount of the savings placed into that tax-deferred retirement account will be $10,000 (as they do not need to pay tax on the contribution at the time of the deposit). However, if the individual wanted to place that same $10,000 into a traditional (i.e., post-tax) savings account, the individual first needs to pay tax on the $10,000. And depending upon the state in which they live and their marginal tax rate, the tax may be >50% of the $10,000. Accordingly, the same $10,000 contribution into a traditional (i.e., post-tax) savings account may result in the amount of the savings placed into that savings account being less than $5,000.

Incremental Funding

Figure 11:
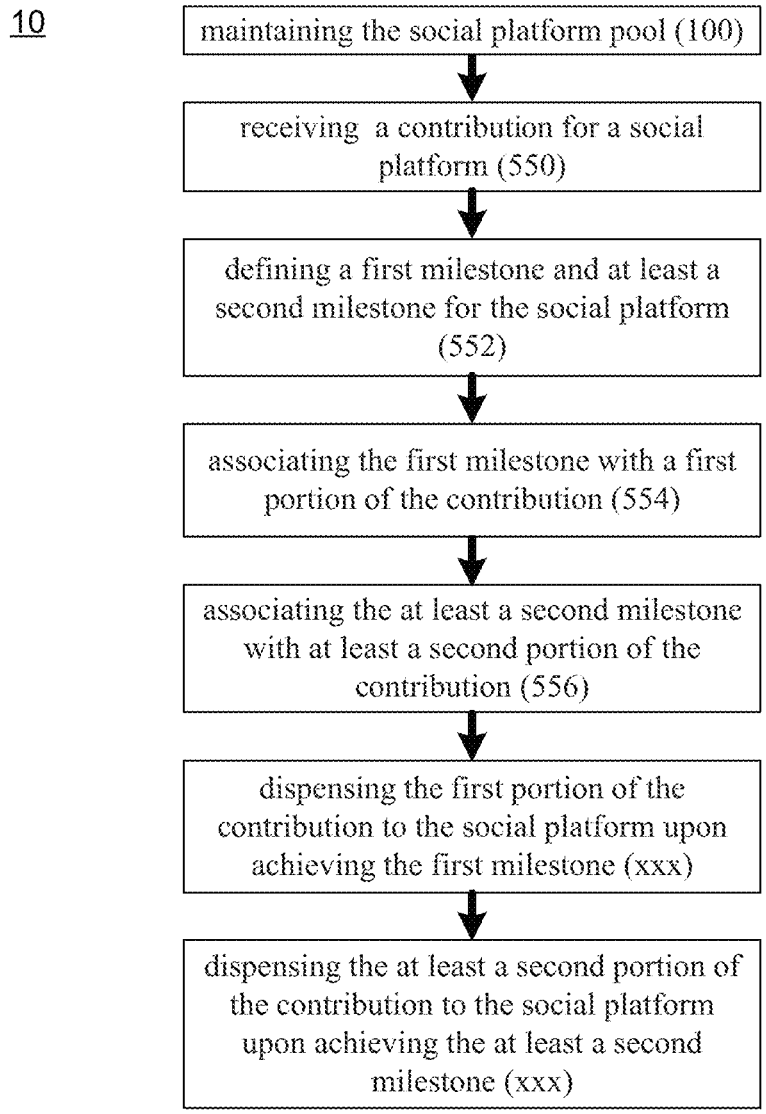
FIG. 11 is a flowchart of another implementation of the social platform promotion process of FIG. 1 according to an embodiment of the present disclosure.

Referring also to FIG. 11, in order to provide a higher level of control concerning the manner in which contributions made to social platforms are utilized, social platform promotion process 10 may be configured to incrementally disperse the contributions to the social platforms.

Continuing with the above-stated example in which client 38 (i.e., the CSR manager of fast food corporation 68) decides to make a $100,000 contribution to social platform 60 (e.g. Baja Plastics), social platform promotion process 10 may receive 550 a contribution (e.g., $100,000) for a social platform (e.g., social platform 60).

Social platform promotion process 10 may define 552 a first milestone and at least a second milestone for the social platform (e.g., social platform 60); and may associate 554 the first milestone with a first portion of the contribution, and may associate 556 the at least a second milestone with at least a second portion of the contribution.

For example, assume that social platform promotion process 10 defines 552 six milestones for this project being handled by platform 60. As discussed above, social platform 60 (e.g. Baja Plastics) committed to recovering 100 tons of water-born plastic in response to receiving a $100,000 contribution. Accordingly, social platform promotion process 10 may define 552 the following milestones:

| Milestone | Task | Funding |
|---|---|---|
| Milestone #1 | Initiate & Startup | $10,000 |
| Milestone #2 | Recover 1st 25 tons | $20,000 |
| Milestone #3 | Recover 2nd 25 tons | $20,000 |
| Milestone #4 | Recover 3rd 25 tons | $20,000 |
| Milestone #5 | Recover 4th 25 tons | $20,000 |
| Milestone #6 | Cleanup & Shutdown | $10,000 |

As shown above, social platform promotion process 10 defined 552 six milestones for this project (i.e., recovering 100 tons of ocean-born plastic), wherein each of these six milestones has a portion of the contribution assigned to it. For example, social platform promotion process 10 may associate 554 the first milestone (e.g., initiate & startup) with a first portion of the contribution (e.g., $10,000), and may associate 556 the at least a second milestone (e.g., milestones 2-6) with at least a second portion of the contribution (e.g., portions 2-6), wherein the distribution of these various portions of the contribution is contingent upon the completion of the defined milestone.

Accordingly, social platform promotion process 10 may:
  dispense 558 the first portion of the $100,000 contribution (namely $10,000) to social platform 60 upon social platform 60 achieving the first milestone (namely the initiation and startup of the project).
  dispense 560 the second portion of the contribution (namely $20,000) to social platform 60 upon social platform 60 achieving the second milestone (namely the recovery of the 1st 25 tons of water-born plastic).

dispense 560 the third portion of the contribution (namely $20,000) to social platform 60 upon social platform 60 achieving the third milestone (namely the recovery of the 2nd 25 tons of water-born plastic).

dispense 560 the fourth portion of the contribution (namely $20,000) to social platform 60 upon social platform 60 achieving the fourth milestone (namely the recovery of the 3rd 25 tons of water-born plastic).

dispense 560 the fifth portion of the contribution (namely $20,000) to social platform 60 upon social platform 60 achieving the fifth milestone (namely the recovery of the 4th 25 tons of water-born plastic).

dispense 560 the six portion of the contribution (namely $10,000) to social platform 60 upon social platform 60 achieving the six milestone (namely the cleanup & shutdown of the project).

Post Funding

Once the above-described social platforms are funded with the above-described contributions, social platform promotion process 10 may initiate the process of publicizing these contributions so that the responsibility score of the client that made these contributions may be positively influenced.

Promotional Material Publication

Figure 12:
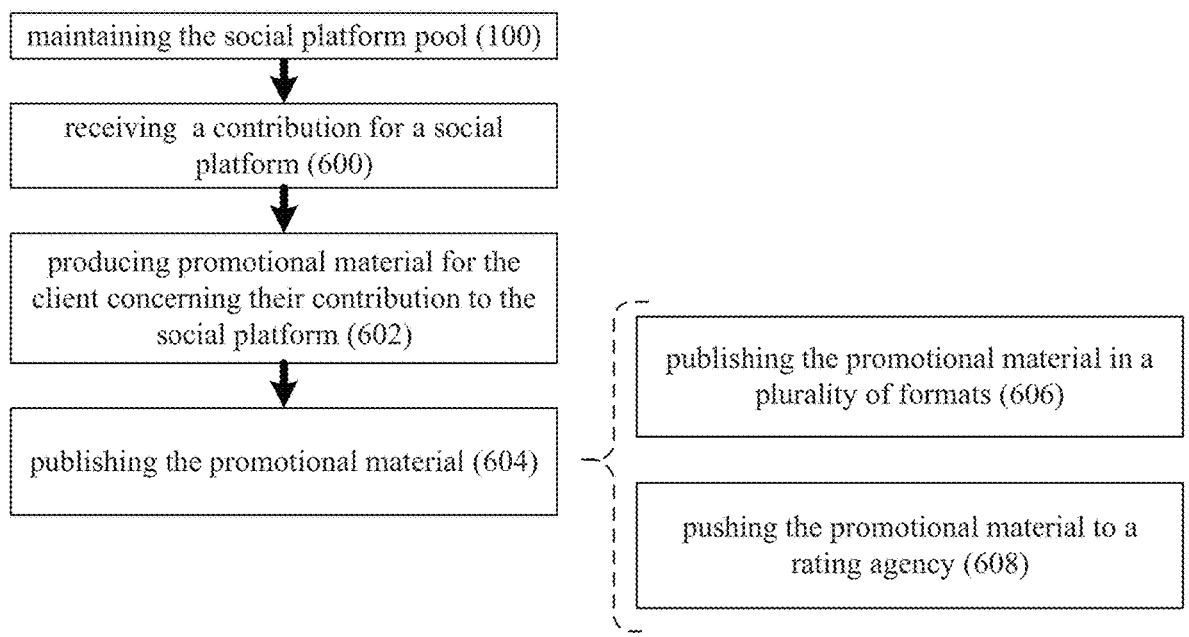
FIG. 12 is a flowchart of another implementation of the social platform promotion process of FIG. 1 according to an embodiment of the present disclosure.

Referring also to FIG. 12 and continuing with the above-described example, social platform promotion process 10 may receive 600 a contribution (e.g., $100,000) for a social platform (e.g., social platform 60) from a client (i.e., client 38, the CSR manager of fast food corporation 68).

As discussed above, social platform 60 may be chosen from the plurality of prevetted social platforms (e.g., plurality of social platforms 58) defined within social platform pool 56. Further and as discussed above, social platform pool 56 may be maintained 100 by social platform promotion process 10 (e.g., within a data structure such as storage device 16 coupled to computing device 12).

Social platform promotion process 10 may produce 602 promotional material 90 for the client (i.e., client 38, the CSR manager of fast food corporation 68) concerning their contribution (i.e., $100,000) to the social platform (e.g., social platform 60), wherein promotional material 90 is configured to positively impact a current responsibility score (e.g., current responsibility score 74) associated with the client (i.e., client 38, the CSR manager of fast food corporation 68). As discussed above, a responsibility score (e.g., current responsibility score 74) may define the manner in which a client (e.g. a corporation or business entity) is viewed with respect to their social responsibility. For example, a current responsibility score (e.g., current responsibility score 74) associated with the client may include one or more of: an environmental score; a social score; and a governance score.

Once produced 602, social platform promotion process 10 may publish 604 promotional material 90, wherein publishing 604 promotional material 90 may include publishing 606 promotional material 90 in a plurality of formats. For example, social platform promotion process 10 may publish 606 promotional material 90 in a human-readable format and/or in a machine-readable format. Accordingly, promotional material 90 may be published 606 in a traditional fashion that is available electronically (e.g., as a PDF document that is downloadable/viewable at a website) or may be published 606 in a machine-readable format (e.g., as a comma-delimited file that is available to and processable by a computer system). Additionally and when publishing 604 promotional material 90, social platform promotion process 10 may push 608 promotional material 90 to a rating agency (e.g., third-party 76), examples of which may include but are not limited to MSCI, Thomson-Reuters, and Sustainalytics. Accordingly and by pushing 608 promotional material 90 to a rating agency (e.g., third-party 76), such promotional material 90 may be processed by third-party 76, resulting in current responsibility score 74 being enhanced to updated responsibility score 74'.

Contribution Return on Investment

Once the above-described contribution is made, the client that made the contribution may be interested in determining how successful that contribution was at bettering the perceived social responsibility of the client.

Figure 13:
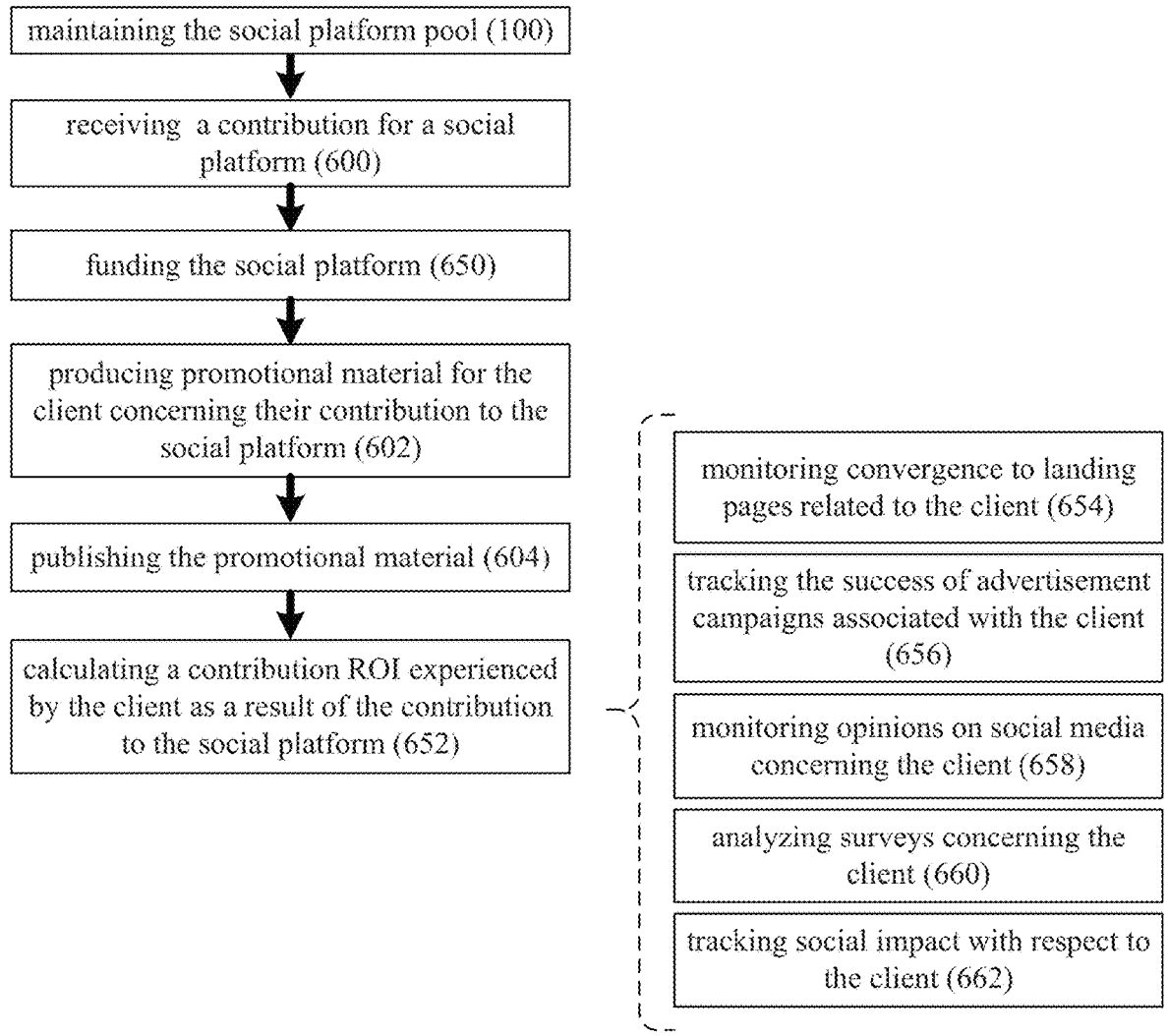
FIG. 13 is a flowchart of another implementation of the social platform promotion process of FIG. 1 according to an embodiment of the present disclosure.

Referring also to FIG. 13 and continuing with the above-stated example in which social platform promotion process 10 receives 600 a $100,000 contribution for social platform 60 from client 38, social platform promotion process 10 may fund 650 the social platform (e.g., social platform 60). This funding of social platform 60 may occur in various ways (e.g., as a single lump sum or may be metered in accordance with various milestones).

As discussed above, social platform 60 may be chosen from the plurality of prevetted social platforms (e.g., plurality of social platforms 58) defined within social platform pool 56. Further and as discussed above, social platform pool 56 may be maintained 100 by social platform promotion process 10 (e.g., within a data structure such as storage device 16 coupled to computing device 12).

Social platform promotion process 10 may produce 602 promotional material 90 for the client (i.e., client 38, the CSR manager of fast food corporation 68) concerning their contribution (i.e., $100,000) to the social platform (e.g., social platform 60), wherein promotional material 90 is configured to positively impact a current responsibility score (e.g., current responsibility score 74) associated with the client (i.e., client 38, the CSR manager of fast food corporation 68). Once produced 602, social platform promotion process 10 may publish 604 promotional material 90.

Once promotional material 90 is published 604, social platform promotion process 10 may calculate 652 a contribution ROI experienced by client 38 as a result of the $100,000 contribution to social platform 60. Accordingly and by calculating such a contribution ROI experienced by client 38, the effectiveness of the $100,000 contribution made to social platform 60 may be determined.

For example and when calculating 652 a contribution ROI experienced by client 38 as a result of the $100,000 contribution to social platform 60, social platform promotion process 10 may:

monitor 654 convergence to landing pages related to the client;

track 656 the success of advertisement campaigns associated with the client;

monitor 658 opinions on social media concerning the client;

analyze 660 surveys concerning the client; and/or track 662 social impact with respect to the client.

Monitoring Convergence:

When monitoring 654 convergence to landing pages related to client 38, social platform promotion process 10 may monitor the internet traffic on the various webpages associated with client 38. For example, an increase in web traffic on the websites that are associated with client 38 may be indicative of the $100,000 contribution to social platform 60 being a successful campaign Tracking Success:

When tracking 656 the success of advertisement campaigns associated with client 38, social platform promotion process 10 may determine whether promotional material 90 was successful by e.g., gauging the reaction of recipients of promotional information 90.

Monitoring Opinions:

When monitoring 658 opinions on social media concerning client 38, social platform promotion process 10 may analyze feedback posted on social media websites that are associated with client 38, wherein such analysis may be performed manually or via machine learning/artificial intelligence.

Analyzing Surveys:

When analyzing 660 surveys concerning client 38, social platform promotion process 10 may execute and/or analyze surveys concerning the perceived social responsibility of client 38, wherein such analysis may be performed manually or via machine learning/artificial intelligence.

Tracking Social Impact:

When tracking 662 social impact with respect to client 38, social platform promotion process 10 may determine an impact on the perceived social responsibility of client 38. This determination may be accomplished in various ways, an example of which may include but is not limited to monitoring movement of the responsibility score associated with client 38.

Once the above-described processes are performed, social platform promotion process 10 may calculate 652 a contribution ROI experienced by client 38, wherein the contribution ROI may numerically quantify the return on investment that was experienced by client 38 in response to (in this example) the $100,000 contribution to social platform 60. For example, social platform promotion process 10 may perform the above-described analysis and assign a monetary value to each finding. Accordingly, social platform promotion process may:

- monitor 654 convergence to landing pages related to client 38 and assign a value of $12,000 to the increase in web traffic.
- track 656 the success of advertisement campaigns associated with client 38 and assign a value of $15,000 to the promotional material.
- monitor 658 opinions on social media concerning client 38 and assign a value of $17,000 to the positive feedback.
- analyze 660 surveys concerning client 38 and assign a value of $8,000 to the enhanced public opinion.
- track 662 social impact with respect to client 38 and assign a value of 9,000 to the enhanced responsibility score.

Accordingly, social platform promotion process 10 may calculate 652 a contribution ROI of 61%, as client 38 received $61,000 in benefits in response to a $100,000 contribution.

Gauging Campaign Success

Figure 14:
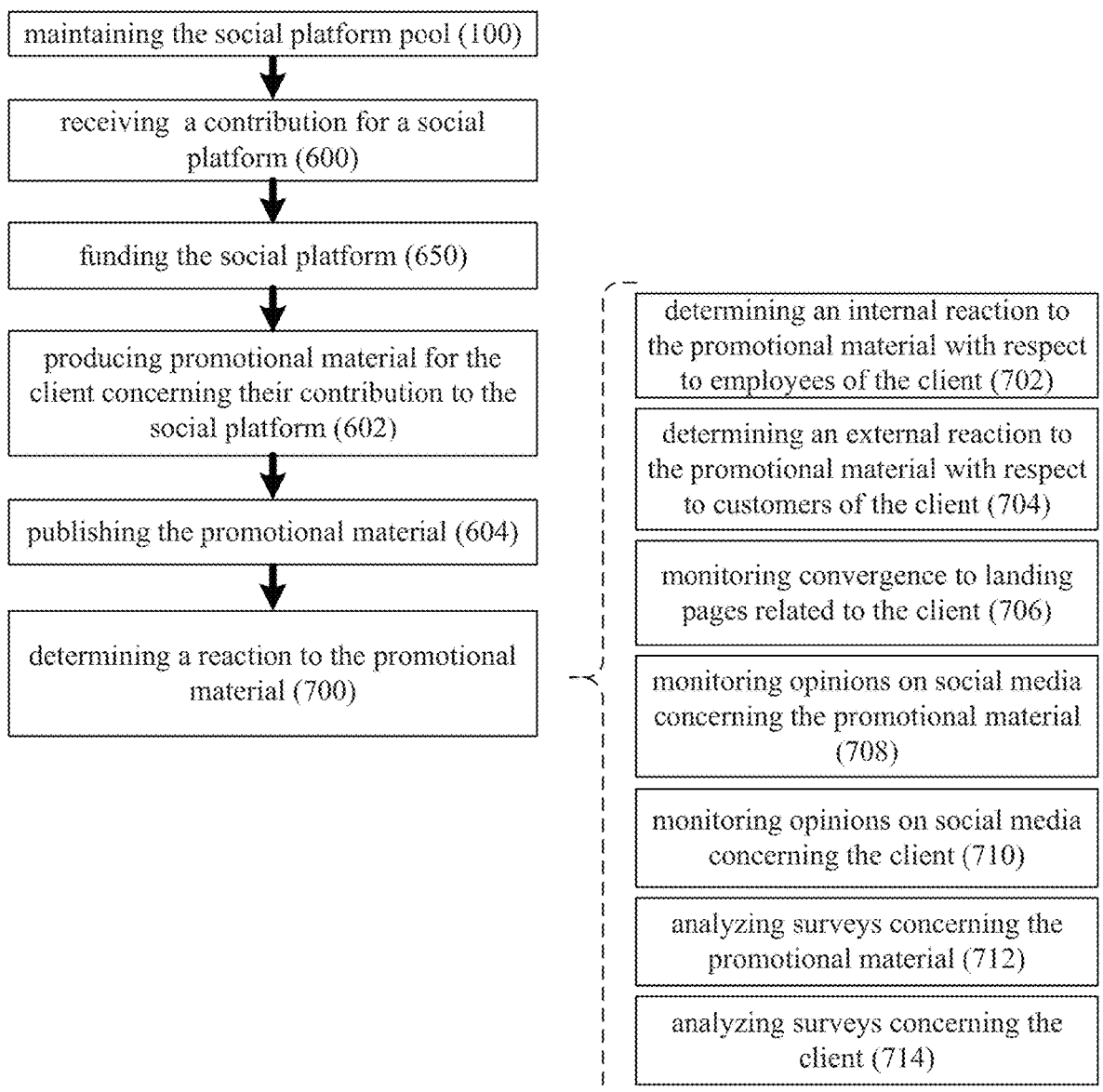
FIG. 14 is a flowchart of another implementation of the social platform promotion process of FIG. 1 according to an embodiment of the present disclosure.

Referring also to FIG. 14 and once the above-described contribution is made, the client that made the contribution may be interested in determining how successful that contribution was at bettering the public opinion of the client.

Continuing with the above-stated example in which social platform promotion process 10 receives 600 a $100,000 contribution for social platform 60 from client 38, social platform promotion process 10 may fund 650 the social platform (e.g., social platform 60). This funding of social platform 60 may occur in various ways (e.g., as a single lump sum or may be metered in accordance with various milestones).

As discussed above, social platform 60 may be chosen from the plurality of prevetted social platforms (e.g., plurality of social platforms 58) defined within social platform pool 56. Further and as discussed above, social platform pool 56 may be maintained 100 by social platform promotion process 10 (e.g., within a data structure such as storage device 16 coupled to computing device 12).

Social platform promotion process 10 may produce 602 promotional material 90 for the client (i.e., client 38, the CSR manager of fast food corporation 68) concerning their contribution (i.e., $100,000) to the social platform (e.g., social platform 60), wherein promotional material 90 is configured to positively impact a current responsibility score (e.g., current responsibility score 74) associated with the client (i.e., client 38, the CSR manager of fast food corporation 68). Once produced 602, social platform promotion process 10 may publish 604 promotional material 90. Once promotional material 90 is published 604, social platform promotion process 10 may determine 700 a reaction to promotional material 90.

When determining 700 a reaction to promotional material 90, social platform promotion process 10 may determine 702 an internal reaction to promotional material 90 with respect to employees of (in this example) client 38. For example, social platform promotion process 10 may determine 702 the manner in which promotion material 90 was received/perceived by the people that work at client 38, as bolstering internal moral with respect to the perceived social responsibility of client 38 may be beneficial for multiple business reasons (e.g., attracting new employees, retaining old employees, and overall employee satisfaction and pride).

When determining 700 a reaction to promotional material 90, social platform promotion process 10 may determine 704 an external reaction to promotional material 90 with respect to customers of (in this example) client 38. For example, social platform promotion process 10 may determine 704 the manner in which promotion material 90 was received/perceived by people external to client 38, as bolstering external moral with respect to the perceived social responsibility of client 38 may be beneficial for multiple business reasons (e.g., attracting new customers, retaining old customers, and overall customer satisfaction and pride).

When determining 700 a reaction to promotional material 90, social platform promotion process 10 may:

- monitor 706 convergence to landing pages related to the client;
- monitor 708 opinions on social media concerning the promotional material;
- monitor 710 opinions on social media concerning the client;
- analyze 712 surveys concerning the promotional material; and
- analyze 714 surveys concerning the client.

Monitoring Convergence:

When monitoring 706 convergence to landing pages related to client 38, social platform promotion process 10 may monitor the internet traffic on the various webpages associated with client 38. For example, an increase in web traffic on the websites that are associated with client 38 may be indicative of a positive reaction to promotional material 90.

Promotional Material Opinions:

When monitoring 708 opinions on social media concerning promotional material 90, social platform promotion process 10 may analyze feedback posted concerning promotional material 90, wherein such analysis may be performed manually or via machine learning/artificial intelligence.

Social Media Opinions:

When monitoring 710 opinions on social media concerning client 38, social platform promotion process 10 may analyze feedback posted on social media websites that are associated with client 38, wherein such analysis may be performed manually or via machine learning/artificial intelligence.

Promotional Material Surveys:

When analyzing 712 surveys concerning promotional material 90, social platform promotion process 10 may execute and/or analyze surveys concerning promotional material 90, wherein such analysis may be performed manually or via machine learning/artificial intelligence.

Client Survey:

When analyzing 714 surveys concerning client 38, social platform promotion process 10 may execute and/or analyze surveys concerning client 38, wherein such analysis may be performed manually or via machine learning/artificial intelligence.

Incorporation into a CRM Platform

As discussed above, the use of social platform promotion process 10 may have numerous beneficiaries, wherein the plurality of social platforms 58 included within social platform pool 56 may benefit from the use of social platform promotion process 10, in that various clients of social platform promotion process 10 may make contributions to the social platforms defined within social platform pool 56. Further and as discussed above, other entities may also be beneficiaries of social platform promotion process 10.

Further and as discussed above, there is always plenty of competition in the business arena, wherein any tool that would result in clients looking more favorably upon a company when it is time spend money may be highly beneficial to that company. Accordingly and as discussed above, social platform promotion process 10 may be configurable in a manner that would help accomplish this highly-desirable task.

Figure 15A:
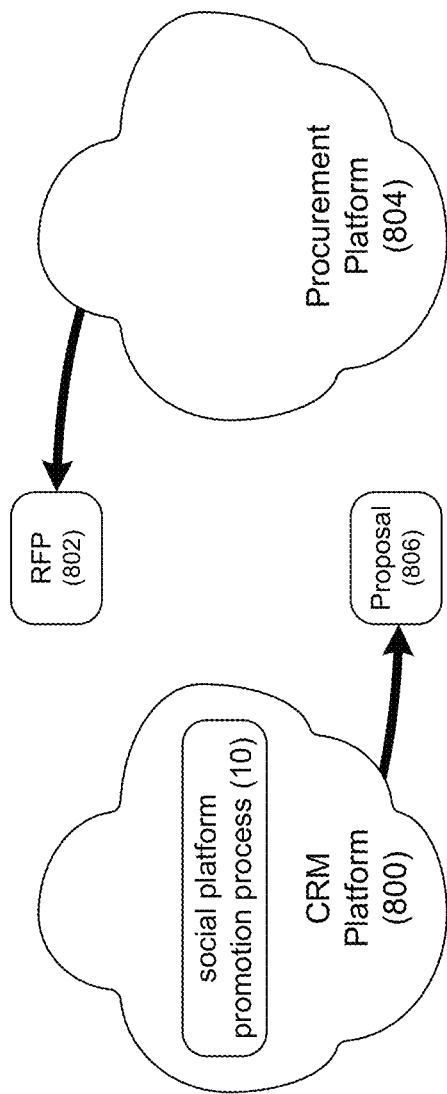
FIG. 15A is a diagrammatic view of the social platform promotion process of FIG. 1 incorporated into a CRM platform according to an embodiment of the present disclosure.
Figure 15B:
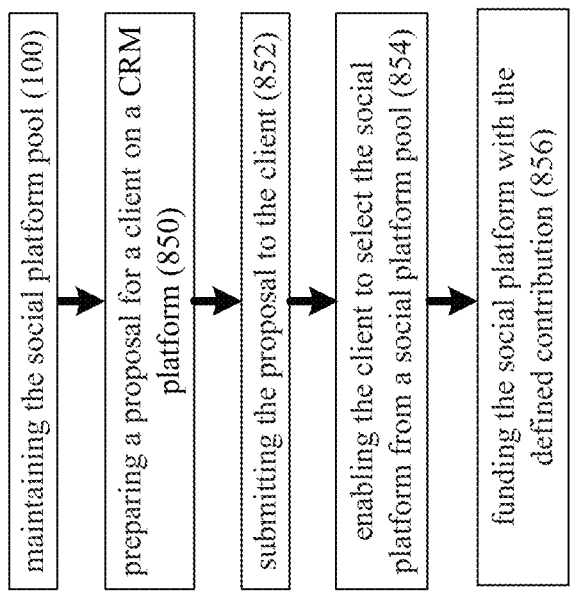
FIG. 15B is a flowchart of another implementation of the social platform promotion process of FIG. 15A according to an embodiment of the present disclosure.

Accordingly and referring also to FIGS. 15A-15B, social platform promotion process 10 may be configured to work with/be incorporated within/be a portion of/interface with a customer relationship manager (CRM) platform (e.g., CRM platform 800). Examples of CRM platform 800 may include but is not limited to the Salesforce™ platform, and the Microsoft Dynamics™ platform.

As is known in the art, a customer relationship management platform (e.g., CRM platform 800) is a software platform configured to manage a company's interaction with current and potential customers. The customer relationship management platform may use data analysis about a customer's history to improve a business relationship with customer; specifically focusing on customer retention and ultimately driving sales growth. One aspect of the customer relationship management platform is that the customer relationship management platform may compile data from a range of different communication channels (e.g., a customer's website, telephone, email, live chat, marketing materials and social media). Through such a customer relationship management platform, businesses may learn more about their target audiences and how to best cater to their needs.

Accordingly and by configuring social platform promotion process 10 to work with/be incorporated within/be a portion of/interface with a customer relationship manager (CRM) platform (e.g., CRM platform 800), the users of CRM platform 800 may be better able to differentiate themselves with respect to their competitors.

As discussed above, when a company (e.g. ABC Burgers) is interested in making a purchase (be it an ad buy from a broadcasting company or widgets from a widget manufacturer), sellers of services/goods (e.g., advertising campaigns or widgets) may be interested in a platform that provides the seller with an edge with respect to their competition (that is selling similar services/goods). Assume, for this particular example, that fast food corporation 68 (e.g. ABC Burgers) wants to enter into a one million-dollar advertising campaign with a broadcasting company . . . but fast food corporation 68 (e.g. ABC Burgers) is not sure which broadcasting company to choose. Accordingly, fast food corporation 68 (e.g. ABC Burgers) may put out an RFP (request for proposal) 802 via procurement platform 804 (to be discussed below in greater detail) stating that (in this particular example) fast food corporation 68 (e.g. ABC Burgers) is interested in engaging a broadcasting company for a one-million-dollar ad campaign.

Assume that broadcasting company 88 is using CRM platform 800 to respond to RFP 802, wherein social platform promotion process 10 may be configured to work with/be incorporated within/be a portion of/interface with CRM platform 800. Accordingly and via social platform promotion process 10, broadcasting company 88 may prepare a proposal (e.g., proposal 806) in response to RFP 802 that may differentiate broadcasting company 88 from their competition.

Accordingly, social platform promotion process 10 may enable broadcasting company 88 to prepare 850 a proposal (e.g., proposal 806) for a client (e.g., fast food corporation 68) on a CRM platform (e.g., CRM platform 800), wherein proposal 806 may identify a defined contribution that will be made to a social platform on behalf of the client (e.g., fast food corporation 68) if the client (e.g., fast food corporation 68) accepts proposal 806. For example, this defined contribution may be a percentage of a purchase made by the client (e.g., fast food corporation 68).

Accordingly and continuing with the above-stated example, proposal 806 prepared 850 using social platform promotion process 10 on CRM platform 800 by broadcasting company 88 in response to RFP 802 may stipulate that broadcasting company 88 agrees to contribute 10% of all advertising campaign dollars received (i.e., the defined contribution) to one of the social platforms (defined within social platform pool 56) on behalf of fast food corporation 68. Therefore and due to this stipulation, if fast food corporation 68 agrees to engage/hire broadcasting company 88 for the $1,000,000 advertising campaign, broadcasting company 88 will contribute 10% (i.e., $100,000) of that $1,000,000 advertising campaign to a social platform (selected from social platform pool 56) of the choosing of fast food corporation 68.

Accordingly and through the use of social platform promotion process 10 that is configured to work with/be incorporated within/be a portion of/interface with a customer relationship manager (CRM) platform (e.g., CRM platform 800), broadcasting company 88 may prepare 850 a proposal (e.g., proposal 806) to RFP 802 that may differentiate broadcasting company 88 from their competition (through the inclusion of such a social platform promotion component in their proposal). Once proposal 806 is prepared 850, social platform promotion process 10 may enable (in this example) broadcasting company 88 to submit 852 proposal 806 to the client (e.g., fast food corporation 68).

Assume for this example that the client (e.g., fast food corporation 68) accepts proposal 806, thus allowing the client (e.g., fast food corporation 68) to benefit from the above-described $100,000 social platform contribution. Accordingly, social platform promotion process 10 may enable 854 the client (e.g., fast food corporation 68) to select the social platform (from social platform pool 56) to which they would like to make the above-described $100,000 social platform contribution.

Accordingly and in the manner described above, social platform promotion process 10 may enable the client (e.g., fast food corporation 68) to search the social platforms defined within social platform pool 56. For example and as discussed above, social platform promotion process 10 may receive a social platform inquiry (e.g., social platform inquiry 70) from the client (e.g., fast food corporation 68), wherein social platform promotion process 10 may execute the social platform inquiry (e.g., social platform inquiry 70) on social platform pool 56 to generate a result set (e.g., result set 72), which may be provided to the client (e.g., client 38). Result set 72 may be chosen from the plurality of prevetted social platforms (e.g., plurality of social platforms 58).

Assume that social platform 60 (e.g. Baja Plastics) is one of the social platforms defined within result set 72, wherein Baja Plastics is an environmental social platform that recovers water-born plastics from the ocean so that such recovered plastic may be recycled. Accordingly and upon reviewing result set 72, the client (e.g., fast food corporation 68) may choose to address their single-use plastics deficiency (as explained above) and may select social platform 60 (e.g. Baja Plastics) as the social platform to which they would like to make the above-described $100,000 social platform contribution.

As discussed above, social platform 60 may be selected from the plurality of prevetted social platforms (e.g., plurality of social platforms 58) defined within social platform pool 56. Further and as discussed above, social platform pool 56 may be maintained 100 by social platform promotion process 10 (e.g., within a data structure such as storage device 16 coupled to computing device 12).

Once social platform 60 is selected by the client (e.g., fast food corporation 68), social platform promotion process 10 may fund 856 the social platform (e.g., social platform 60) with the defined contribution of $100,000. As discussed above, the funding 856 of social platform 60 may occur in various ways (e.g., as a single lump sum or may be metered in accordance with various milestones).

As discussed above and when funding 856 the social platform (e.g., social platform 60) with the defined contribution of $100,000, social platform promotion process 10 may fund 858 the social platform (e.g., social platform 60) with the defined contribution of $100,000 at a gross revenue level using one or more funding sources, examples of which may include but are not limited to: a corporate social responsibility (CSR) funding source; and a sales incentive funding source.

As discussed above, funding 858 the social platform (e.g., social platform 60) with the defined contribution of $100,000 at a gross revenue level (i.e., as opposed to the net-net level) results in funding the defined contribution (i.e., $100,000) with one or more of: pre-tax revenue, pre-expense revenue, and pre-tax/pre-expense revenue. As discussed above, when e.g. social platform 60 is funded at the net-net level, the quantity of funding received by the social platform is adversely impacted. Accordingly, by funding social platform 60 at the gross revenue level (be it with pre-tax revenue, pre-expense revenue or pre-tax/pre-expense revenue), the quantity of funding received by social platform 60 will be enhanced.

Incorporation into a Procurement Platform

Figure 16A:
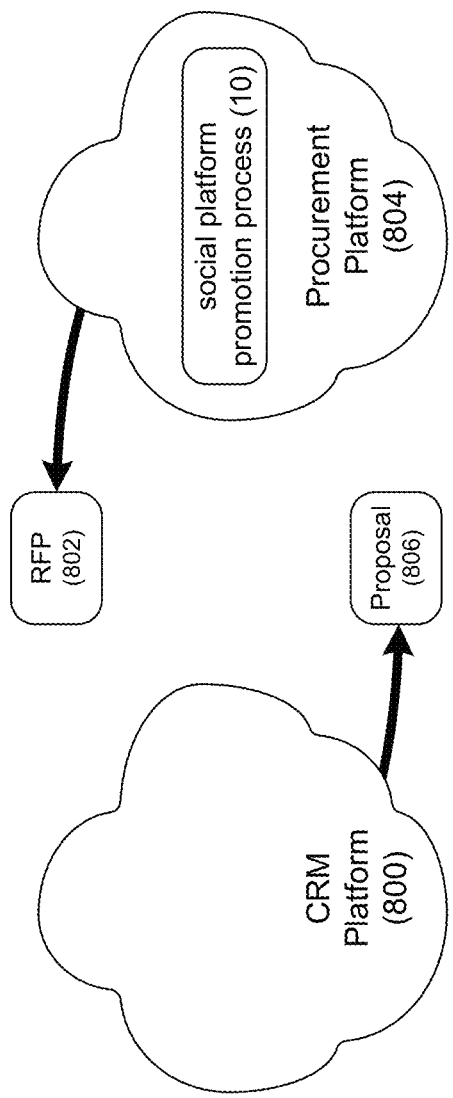
FIG. 16A is a diagrammatic view of the social platform promotion process of FIG. 1 incorporated into a procurement platform according to an embodiment of the present disclosure.
Figure 16B:
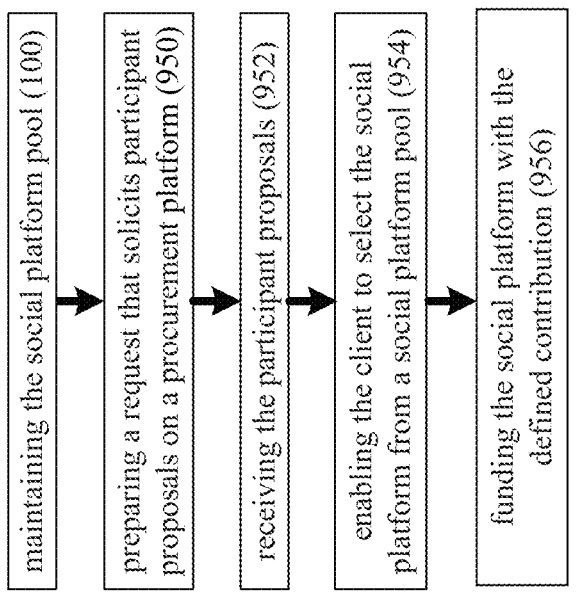
FIG. 16B is a flowchart of another implementation of the social platform promotion process of FIG. 16A according to an embodiment of the present disclosure.

Referring also to FIGS. 16A-16B, social platform promotion process 10 may be configured to work with/be incorporated within/be a portion of/interface with a procurement platform (e.g., procurement platform 900). Examples of procurement platform 900 may include but is not limited to the SAP Ariba™ platform, and the Coupa™ platform.

As is known in the art, a procurement platform (e.g., procurement platform 900) is a software platform configured to help automate the purchasing function of organizations. Activities handled by a procurement platform may include raising and approving purchase orders, selecting and ordering products/services, receiving/matching invoice & order, and paying of bills, thus enabling e.g., the procurement department to see everything that is ordered, ensure that nothing can be ordered without correct approvals, and enabling enhanced value by e.g., combining several orders for the same type of good/service or requiring suppliers to submit bids for the business. Accordingly, a multinational or otherwise large organization may use a shared procurement system to take advantage of economies of scale to drive down the cost of purchases. One benefit for organizations using a procurement platform may include ease of administration and potential long-term cost savings, as a single interface for procurement-related management information may reduce the time and effort required to monitor organizational spending. Accordingly, the use of such a procurement platform may allow procurement managers to control the vendors used by the wider organization so that all employees may take advantage of negotiated rates and other terms of service.

Again and for this particular example, assume that fast food corporation 68 (e.g. ABC Burgers) wants to enter into a one million-dollar advertising campaign with a broadcasting company . . . but fast food corporation 68 (e.g. ABC Burgers) is not sure which broadcasting company to choose. Further, assume that fast food corporation 68 (e.g. ABC Burgers) is using procurement platform 804 to solicit proposals with respect to such a one million-dollar advertising campaign with a broadcasting company Accordingly and by configuring social platform promotion process 10 to work with/be incorporated within/be a portion of/interface with a procurement platform (e.g., procurement platform 900), the users of procurement platform 900 may be able to require respondents to define a social platform contribution within any proposal that they submit.

Accordingly, social platform promotion process 10 may enable fast food corporation 68 (e.g. ABC Burgers) to prepare 950 a request (e.g., RFP 802) that solicits participant proposals on a procurement platform (e.g., procurement platform 804) stating that (in this particular example) fast food corporation 68 (e.g. ABC Burgers) is interested in engaging a broadcasting company for a one-million-dollar ad campaign.

The request (e.g., RFP 802) may identify a defined contribution that will be made to a social platform on behalf of a client (e.g., fast food corporation 68) if the client (e.g., fast food corporation 68) accepts a particular participant proposal. For example, this defined contribution may be a percentage of a purchase made by the client (e.g., fast food corporation 68).

Accordingly and continuing with the above-stated example, RFP 802 prepared 950 on procurement platform 804 by fast food corporation 68 (e.g. ABC Burgers) may stipulate that all respondents to RFP 802 agree to contribute 10% of all advertising campaign dollars received (i.e., the defined contribution) to one of the social platforms (defined within social platform pool 56) on behalf of (in this example) fast food corporation 68. Therefore and due to this stipulation, if fast food corporation 68 agrees to engage/hire a broadcasting company (e.g., broadcasting company 88) for the $1,000,000 advertising campaign, the engaged/hired broadcasting company (e.g., broadcasting company 88) will contribute 10% (i.e., $100,000) of that $1,000,000 advertising campaign to a social platform (selected from social platform pool 56) of the choosing of fast food corporation 68.

Accordingly and through the use of social platform promotion process 10 that is configured to work with/be incorporated within/be a portion of/interface with a procurement platform (e.g., procurement platform 804), fast food corporation 68 may prepare 950 a request (e.g., RFP 802) that may require respondents to define a social platform contribution within any proposal that they submit. Once RFP 802 is prepared 950, social platform promotion process 10 may enable (in this example) fast food corporation 68 to receive 952 participant proposals.

Assume for this example that the client (e.g., fast food corporation 68) receives several proposals, reviews each of the same, and accepts proposal 806 (i.e., the proposal prepared by broadcasting company 88). Accordingly, social platform promotion process 10 may enable 954 the client (e.g., fast food corporation 68) to select the social platform (from social platform pool 56) to which they would like to make the above-described $100,000 social platform contribution.

Accordingly and in the manner described above, social platform promotion process 10 may enable the client (e.g., fast food corporation 68) to search the social platforms defined within social platform pool 56. For example and as discussed above, social platform promotion process 10 may receive a social platform inquiry (e.g., social platform inquiry 70) from the client (e.g., fast food corporation 68), wherein social platform promotion process 10 may execute the social platform inquiry (e.g., social platform inquiry 70) on social platform pool 56 to generate a result set (e.g., result set 72), which may be provided to the client (e.g., client 38). Result set 72 may be chosen from the plurality of prevetted social platforms (e.g., plurality of social platforms 58).

Again, assume that social platform 60 (e.g. Baja Plastics) is one of the social platforms defined within result set 72, wherein Baja Plastics is an environmental social platform that recovers water-born plastics from the ocean so that such recovered plastic may be recycled. Accordingly and upon reviewing result set 72, the client (e.g., fast food corporation 68) may choose to address their single-use plastics deficiency (as explained above) and may select social platform 60 (e.g. Baja Plastics) as the social platform to which they would like to make the above-described $100,000 social platform contribution.

As discussed above, social platform 60 may be selected from the plurality of prevetted social platforms (e.g., plurality of social platforms 58) defined within social platform pool 56. Further and as discussed above, social platform pool 56 may be maintained 100 by social platform promotion process 10 (e.g., within a data structure such as storage device 16 coupled to computing device 12).

Once social platform 60 is selected by the client (e.g., fast food corporation 68), social platform promotion process 10 may fund 956 the social platform (e.g., social platform 60) with the defined contribution of $100,000. As discussed above, the funding 956 of social platform 60 may occur in various ways (e.g., as a single lump sum or may be metered in accordance with various milestones).

As discussed above and when funding 956 the social platform (e.g., social platform 60) with the defined contribution of $100,000, social platform promotion process 10 may fund 958 the social platform (e.g., social platform 60) with the defined contribution of $100,000 at a gross revenue level using one or more funding sources, examples of which may include but are not limited to: a corporate social responsibility (CSR) funding source; and a sales incentive funding source.

As discussed above, funding 958 the social platform (e.g., social platform 60) with the defined contribution of $100,000 at a gross revenue level (i.e., as opposed to the net-net level) results in funding the defined contribution (i.e., $100,000) with one or more of: pre-tax revenue, pre-expense revenue, and pre-tax/pre-expense revenue. As discussed above, when e.g. social platform 60 is funded at the net-net level, the quantity of funding received by the social platform is adversely impacted. Accordingly, by funding social platform 60 at the gross revenue level (be it with pre-tax revenue, pre-expense revenue or pre-tax/pre-expense revenue), the quantity of funding received by social platform 60 will be enhanced.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the client's computer, partly on the client's computer, as a stand-alone software package, partly on the client's computer and partly on a remote computer or entirely on the remote computer or server. In the latter scenario, the remote computer may be connected to the client's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   determining a responsibility score associated with a client;
   analyzing the responsibility score to determine one or more score conditions, wherein the one or more score conditions relate to issues with respect to which the client is perceived as having a given social responsibility;
   receiving a contribution for a social platform from a client;
   producing promotional material for the client concerning their contribution to the social platform, wherein this promotional material is configured to positively impact a current responsibility score associated with the client;
   publishing the promotional material in one or more different formats, wherein the one or more different formats include a human readable format that is electronically available to at least one of download and view on a website, and a machine readable format that is processable by a computing system;
   monitoring one or more of:
     convergence to one or more landing pages associated with the client,
     and social network feedback posted on social network websites;
   monitoring an updated responsibility score, wherein the updated responsibility score is indicative of social impact; and calculating a contribution return on investment, based at least in part on the monitoring of convergence to the one or more landing pages associated with the client, and/or the monitoring of social network feedback posted on the social network websites, and the monitoring of the updated responsibility score, indicating how successful the contribution was at improving a perceived social responsibility of the client.

2. The computer-implemented method of claim 1 wherein the social platform is chosen from a social platform pool.

3. The computer-implemented method of claim 2 wherein the social platform pool defines a plurality of prevetted social platforms.

4. The computer-implemented method of claim 2 further comprising:
   maintaining the social platform pool.

5. The computer-implemented method of claim 4 wherein the social platform pool is maintained within a data structure.

6. The computer-implemented method of claim 1 wherein publishing the promotional material includes:
   publishing the promotional material in a plurality of formats.

7. The computer-implemented method of claim 1 wherein publishing the promotional material includes:
   pushing the promotional material to a rating agency.

8. The computer-implemented method of claim 1 wherein the current responsibility score associated with the client includes one or more of:
   an environmental score;
   a social score; and
   a governance score.

9. A computer program product residing on a non-transitory computer readable medium having a plurality of instructions stored thereon which, when executed by a processor, cause the processor to perform operations comprising:
   determining a responsibility score associated with a client;
   analyzing the responsibility score to determine one or more score conditions wherein the one or more score conditions relate to issues with respect to which the client is perceived as having a given social responsibility;
   receiving a contribution for a social platform from a client;
   producing promotional material for the client concerning their contribution to the social platform, wherein this promotional material is configured to positively impact a current responsibility score associated with the client;
   publishing the promotional material in one or more different formats, wherein the one or more different formats include a human readable format that is electronically available to at least one of download and view on a website, and a machine readable format that is processable by a computing system;
   monitoring one or more of:
      convergence to one or more landing pages associated with the client,
      and social network feedback posted on social network websites;
   monitoring an updated responsibility score, wherein the updated responsibility score is indicative of social impact; and
   calculating a contribution return on investment, based at least in part on the monitoring of convergence to the one or more landing pages associated with the client, and/or the monitoring of social network feedback posted on the social network websites, and the monitoring of the updated responsibility score, indicating how successful contribution was at improving a perceived social responsibility of the client.

10. The computer program product of claim 9 wherein the social platform is chosen from a social platform pool.

11. The computer program product of claim 10 wherein the social platform pool defines a plurality of prevetted social platforms.

12. The computer program product of claim 10 further comprising:
    maintaining the social platform pool.

13. The computer program product of claim 12 wherein the social platform pool is maintained within a data structure.

14. The computer program product of claim 9 wherein publishing the promotional material includes:
    publishing the promotional material in a plurality of formats.

15. The computer program product of claim 9 wherein publishing the promotional material includes:
    pushing the promotional material to a rating agency.

16. The computer program product of claim 9 wherein the current responsibility score associated with the client includes one or more of:
    an environmental score;
    a social score; and
    a governance score.

17. A computing system including a processor and memory configured to perform operations comprising:
    determining a responsibility score associated with a client;
    analyzing the responsibility score to determine one or more score conditions, wherein the one or more score conditions relate to issues with respect to which the client is perceived as having a given social responsibility;
    receiving a contribution for a social platform from a client;
    producing promotional material for the client concerning their contribution to the social platform, wherein this promotional material is configured to positively impact a current responsibility score associated with the client;
    publishing the promotional material in one or more different formats, wherein the one or more different formats include a human readable format that is electronically available to at least one of download and view on a website, and a machine readable format that is processable by a computing system;
    monitoring one or more of:
       convergence to one or more landing pages associated with the client,
       and social network feedback posted on social network websites;
    monitoring an updated responsibility score, wherein the updated responsibility score is indicative of social impact; and
    calculating a contribution return on investment, based at least in part on the monitoring of convergence to the one or more landing pages associated with the client, and/or the monitoring of social network feedback posted on the social network websites, and the monitoring of the updated responsibility score, indicating how successful the contribution was at improving a perceived social responsibility of the client.

18. The computing system of claim 17 wherein the social platform is chosen from a social platform pool.

19. The computing system of claim 18 wherein the social platform pool defines a plurality of prevetted social platforms.

20. The computing system of claim 18 further comprising:
maintaining the social platform pool.

21. The computing system of claim 20 wherein the social platform pool is maintained within a data structure.

22. The computing system of claim 17 wherein publishing the promotional material includes:
publishing the promotional material in a plurality of formats.

23. The computing system of claim 17 wherein publishing the promotional material includes:
pushing the promotional material to a rating agency.

24. The computing system of claim 17 wherein the current responsibility score associated with the client includes one or more of:
an environmental score;
a social score; and
a governance score.

* * * * *